(12) United States Patent
Akiyama

(10) Patent No.: US 7,782,346 B2
(45) Date of Patent: Aug. 24, 2010

(54) LIQUID CRYSTAL DISPLAY

(75) Inventor: Hiroto Akiyama, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 678 days.

(21) Appl. No.: 11/576,402

(22) PCT Filed: Sep. 29, 2005

(86) PCT No.: PCT/JP2005/017982

§ 371 (c)(1),
(2), (4) Date: Jul. 24, 2007

(87) PCT Pub. No.: WO2006/035887

PCT Pub. Date: Apr. 6, 2006

(65) Prior Publication Data

US 2008/0049052 A1    Feb. 28, 2008

(30) Foreign Application Priority Data

Sep. 30, 2004    (JP)    ............... 2004-289157

(51) Int. Cl.
*G09G 5/02*    (2006.01)

(52) U.S. Cl. .................. 345/694; 345/50; 345/88; 345/89; 349/73; 349/84; 349/108; 349/144

(58) Field of Classification Search ............... 345/50, 345/55, 87–90, 93, 694–696, 690; 349/73, 349/74, 77, 83–85, 108, 109, 144

See application file for complete search history.

(56) References Cited

U.S. PATENT DOCUMENTS 5,963,190 A * 10/1999 Tsuboyama et al. ......... 345/103

(Continued)

FOREIGN PATENT DOCUMENTS

EP    0 330 428    A2    8/1989

(Continued)

OTHER PUBLICATIONS

Official communication issued in counterpart European Application No. 05787672.4, mailed on Oct. 9, 2008.

(Continued)

*Primary Examiner*—Henry N Tran
(74) *Attorney, Agent, or Firm*—Keating & Bennett, LLP

(57) ABSTRACT

A liquid crystal display device includes a plurality of pixels that are arranged in matrix so as to form a plurality of rows extending in an X direction and a plurality of columns extending in a Y direction. Each pixel includes a liquid crystal layer and a plurality of electrodes for applying a voltage to the liquid crystal layer, and is split into at least one bright subpixel, which has a luminance higher than a certain luminance produced by a display signal voltage supplied, and at least one dark subpixel that has a lower luminance than the certain luminance. The area of the at least one bright subpixel is smaller than that of the at least one dark subpixel. If the at least one bright subpixel and the at least one dark subpixel are arranged in the Y direction in each pixel, two closest pixels that belong to the same row to display the same color have geometric centroids with mutually different Y coordinates. The greatest difference between the Y coordinates of luminance centroids is equal to or smaller than a half of the length $R_Y$ of the two pixels as measured in the Y direction.

17 Claims, 15 Drawing Sheets

U.S. PATENT DOCUMENTS

| | | | |
|---|---|---|---|
| 6,014,121 A * | 1/2000 | Aratani et al. | 345/89 |
| 6,958,791 B2 | 10/2005 | Shimoshikiryo | |
| 7,034,789 B2 | 4/2006 | Takeuchi et al. | |
| 7,079,214 B2 | 7/2006 | Shimoshikiryo | |
| 7,113,159 B2 | 9/2006 | Sawabe | |
| 7,248,268 B2 * | 7/2007 | Brown Elliott et al. | 345/613 |
| 7,486,286 B2 * | 2/2009 | Kim et al. | 345/204 |
| 2003/0146893 A1 | 8/2003 | Sawabe | |
| 2003/0227429 A1 | 12/2003 | Shimoshikiryo | |
| 2004/0001167 A1 | 1/2004 | Takeuchi et al. | |
| 2004/0135147 A1 | 7/2004 | Kim et al. | |
| 2005/0062904 A1 | 3/2005 | Shimoshikiryoh | |
| 2005/0122441 A1 | 6/2005 | Shimoshikiryoh | |
| 2005/0213015 A1 | 9/2005 | Shimoshikiryo | |
| 2005/0225563 A1 * | 10/2005 | Brown Elliott et al. | 345/604 |
| 2006/0097972 A1 | 5/2006 | Takeuchi et al. | |
| 2006/0256271 A1 | 11/2006 | Shimoshikiryo | |
| 2008/0049052 A1 * | 2/2008 | Akiyama | 345/694 |

FOREIGN PATENT DOCUMENTS

| | | |
|---|---|---|
| EP | 0 673 011 A1 | 9/1995 |
| EP | 1 024 473 A2 | 8/2000 |
| JP | 63-174017 A | 7/1988 |
| JP | 02-073234 A | 3/1990 |
| JP | 2003-295160 A | 10/2003 |
| JP | 2004-029716 A | 1/2004 |
| JP | 2004-062146 A | 2/2004 |
| JP | 2004-078157 A | 3/2004 |

OTHER PUBLICATIONS

Official Communication for PCT Application No. PCT/JP2005/017982; mailed on Nov. 8, 2005.

Official communication issued in the counterpart International Application No. PCT/JP2005/017982, mailed on Apr. 12, 2007.

* cited by examiner (a)

(b) PRIOR ART

1:1 DIVISION    1:2 DIVISION    1:3 DIVISION

BETTER γ CHARACTERISTIC ON OBLIQUE VIEW

1:3 DIVISION

BRIGHT DISPLAY   HALF TONE DISPLAY   DARK DISPLAY

GREATEST DIFFERENCE BETWEEN LUMINANCE CENTROIDS WHEN PIXELS ARE SHIFTED

GREATEST DIFFERENCE BETWEEN LUMINANCE CENTROIDS WHEN PIXELS ARE NOT SHIFTED

FIG.15
(a) PRIOR ART
(b)
(c)
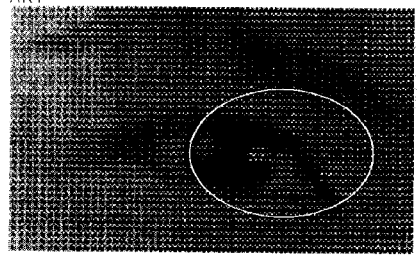
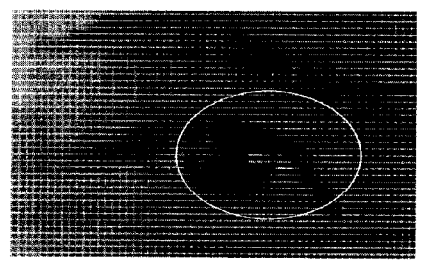
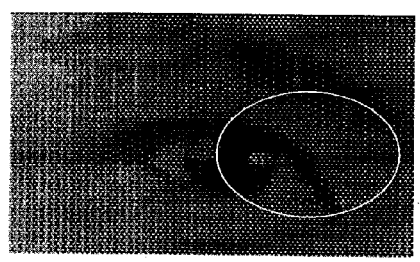
FIG.16
(a)
(b)
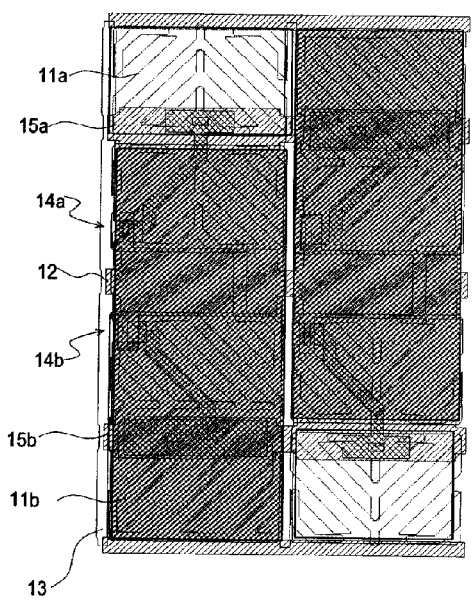
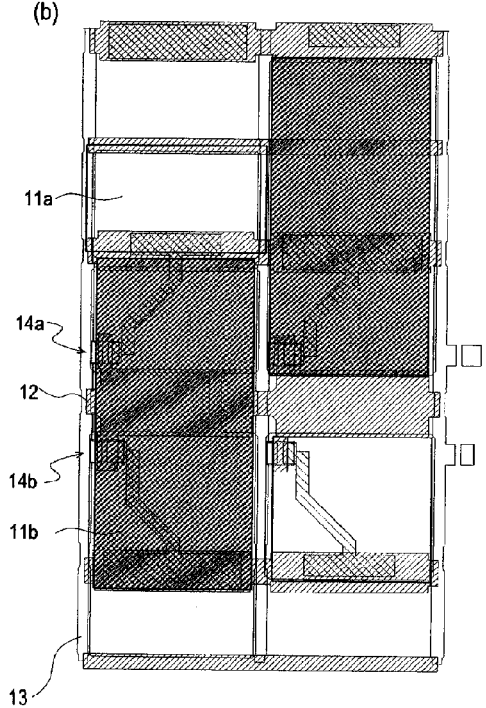

LIQUID CRYSTAL DISPLAY

BACKGROUND OF THE INVENTION

1. Field of the Invention

The present invention relates to a liquid crystal display device and a method for driving the device.

2. Description of the Related Art

In the past, TN-mode liquid crystal displays (LCDs) were used often. Recently, however, VA-mode LCDs and IPS-mode LCDs with better viewing angle characteristics than the TN-mode LCDs have been used more and more extensively. Meanwhile, MVA-mode LCDs and S-IPS mode LCDs with further improved viewing angle characteristics have been used for TVs and monitors lately.

The VA mode realizes black display of higher quality than the IPS mode, and therefore, contributes to presenting images at a higher contrast ratio. But the VA mode is inferior to the IPS mode in that the γ characteristic has heavier viewing angle dependence.

The applicant of the present application developed a novel pixel division technique as a means for reducing the viewing angle dependence of the γ characteristic in the VA mode and disclosed it in Japanese Patent Application Laid-Open Publication No. 2004-62146 (Patent Document No. 1) and Japanese Patent Application Laid-Open Publication No. 2004-78157 (Patent Document No. 2). According to this pixel division technique, each pixel is divided into at least two subpixels with mutually different luminances and the γ characteristics of those subpixels are superposed one upon the other, thereby improving the γ characteristic when the screen is viewed obliquely. Specifically, Patent Documents Nos. 1 and 2 disclose the technique of making the luminances of those subpixels different from each other by applying storage capacitor counter voltages through electrically isolated CS bus lines to storage capacitors (CS) that are provided for respective subpixels.

Another pixel division technique was disclosed in Japanese Patent Application Laid-Open Publication No. 2003-295160 (Patent Document No. 3), for example, prior to the filing of Patent Documents Nos. 1 and 2. The LCD disclosed in Patent Document No. 3 has a configuration in which display signal voltages are applied independently of each other to a plurality of subpixels that a single pixel has. That is to say, if each pixel is made up of two subpixels (which will be referred to herein as "first and second subpixels", respectively), a source bus line for applying a display signal voltage to the first subpixel and another source bus line for applying a display signal voltage to the second subpixel need to be provided separately. That is why if each pixel is divided into two, then the number of source bus lines and the number of source drivers need to be doubled. On the other hand, in the LCDs disclosed in Patent Documents Nos. 1 and 2, a common display signal voltage is applied through the same source bus line to the first and second subpixels, and there is no need to increase the number of source bus lines or source drivers according to the number of divisions.

According to the pixel division technique, a pixel division structure is adopted as schematically shown in FIG. 1(a). Specifically, a single pixel P shown in FIG. 1(b) is divided into two subpixels SP1 and SP2, of which the luminances are made different in a particular range, thereby reducing the viewing angle dependence of the γ characteristic. In the example shown in FIG. 1, each pixel is divided into two. However, the number of divisions does not have to be two but each pixel may be divided into any other number of subpixels.

Patent Document No. 1 discloses that in applying the pixel division technique described in Patent Document No. 1 to a VA-mode LCD, the area ratio of a bright subpixel (e.g., SP1 in the example shown in FIG. 2) to a dark subpixel (e.g., SP2 in FIG. 2) is preferably defined such that the bright subpixel has a smaller area than the dark subpixel to further improve the γ characteristic when the screen is viewed obliquely. If there are two or more bright subpixels and two or more dark subpixels, the combined area of the bright subpixels is compared to the combined of the dark subpixels. It should be noted that a subpixel that has a higher luminance than that realized by its pixel (to be determined by an input video signal, for example) will be referred to herein as a "bright subpixel", while a subpixel that has a lower luminance that that realized by its pixel a "dark subpixel".

Patent Document No. 1 also discloses that when a single pixel is divided into a plurality of subpixels with mutually different luminances, those subpixels with intentionally varied luminances are preferably arranged as randomly as possible (i.e., so as not to follow the order of magnitudes of the luminances) such that multiple subpixels with the same degree of luminance are not adjacent to each other in a column direction or in a row direction. Specifically, Patent Document No. 1 gives an example in which a single pixel is divided into two subpixels with a one to one area ratio and in which the bright and dark subpixels are arranged in a checkered pattern. However, this patent document fails to teach how those bright and dark subpixels should be arranged in a situation where the area ratio of the bright subpixels to the dark subpixels is uneven (e.g., one to three).

According to the disclosure of Patent Document No. 1 about a two-subpixel structure in which the area ratio of the bright subpixel to the dark subpixel is one to three, the arrangements shown in FIGS. 3(a), 3(b) and 3(c) in which multiple subpixels with the same magnitude of luminance are adjacent to each other either in the column direction or in the row direction would not be preferred but the checkered pattern shown in FIG. 3(d) should be preferred.

When the present inventors adopted the arrangement shown in FIG. 3(d), however, the resultant image either looked blurred (i.e., with an unclear contour) or generated zigzag lines (i.e., a pseudo contour) in the row direction as shown in FIG. 15(a). These phenomena are observed when the difference in luminance between the bright and dark subpixels changes according to the gray scale to be displayed. And we discovered that those phenomena were caused because the luminance centroid of a pixel shifted with the gray scale to be displayed. It should be noted that the "pixel" refers to herein the minimum display unit of an LCD and corresponds to a "picture element (or dot)" that displays each color (which is typically R, G or B) in a color display device. Also, when the arrangement of pixels is discussed for a color display device, it is pixels to display the same color that should be arranged unless otherwise stated. For example, the three pixels shown in FIG. 3 are pixels to display the same color. As for a physical arrangement in a color display device, pixels (i.e., picture elements or dots) to display other colors will be present between the pixels illustrated.

SUMMARY OF THE INVENTION

In order to overcome the problems described above, an object of the present invention is to minimize the decrease in the display quality of a liquid crystal display device with such a pixel division structure due to the shift of luminance centroid.

A liquid crystal display device according to the present invention includes a plurality of pixels that are arranged in matrix so as to form a plurality of rows extending in an X direction and a plurality of columns extending in a Y direction. Each said pixel includes a liquid crystal layer and a plurality of electrodes for applying a voltage to the liquid crystal layer, and is split into at least one bright subpixel, which has a luminance higher than a certain luminance produced by a display signal voltage supplied, and at least one dark subpixel that has a lower luminance than the certain luminance. The area of the at least one bright subpixel is smaller than that of the at least one dark subpixel. If the at least one bright subpixel and the at least one dark subpixel are arranged in the Y direction in each said pixel, two closest pixels that belong to the same row to display the same color have geometric centroids with mutually different Y coordinates. The greatest difference between the Y coordinates of luminance centroids is equal to or smaller than a half of the length $R_Y$ of the two pixels as measured in the Y direction. Or if the at least one bright subpixel and the at least one dark subpixel are arranged in the X direction in each said pixel, two pixels that are adjacent to each other in the column direction have geometric centroids with mutually different X coordinates. The greatest difference between the X coordinates of luminance centroids is equal to or smaller than a half of the length $R_X$ of the two pixels as measured in the X direction.

Another liquid crystal display device according to the present invention includes a plurality of pixels that are arranged in matrix so as to form a plurality of rows extending in an X direction and a plurality of columns extending in a Y direction. Each said pixel includes a liquid crystal layer and a plurality of electrodes for applying a voltage to the liquid crystal layer, and is split into at least one bright subpixel, which has a luminance higher than a certain luminance produced by a display signal voltage supplied, and at least one dark subpixel that has a lower luminance than the certain luminance. The area of the at least one bright subpixel is smaller than that of the at least one dark subpixel. If the at least one bright subpixel and the at least one dark subpixel are arranged in the Y direction in each said pixel, two closest pixels that belong to the same row to display the same color have geometric centroids with mutually different Y coordinates. A difference between the Y coordinates of the luminance centroids of their respective bright subpixels is equal to or smaller than a half of the length $R_Y$ of the two pixels as measured in the Y direction. Or if the at least one bright subpixel and the at least one dark subpixel are arranged in the X direction in each said pixel, two pixels that are adjacent to each other in the column direction have geometric centroids with mutually different X coordinates. A difference between the X coordinates of the luminance centroids of their respective bright subpixels is equal to or smaller than a half of the length $R_X$ of the two pixels as measured in the X direction.

In one preferred embodiment, supposing the geometric centroid of one of the two closest pixels that belong to the same row to display the same color is defined as an origin, the Y coordinate of the luminance centroid of the bright subpixel of that pixel is positive. On the other hand, supposing the geometric centroid of the other pixel is defined as an origin, the Y coordinate of the luminance centroid of the bright subpixel of that pixel is negative.

In another preferred embodiment, in every pixel belonging to the same column, the at least one bright subpixel and the at least one dark subpixel are arranged at the same locations of theirs.

In still another preferred embodiment, the at least one bright subpixel that each said pixel has is the only bright subpixel of that pixel.

In this particular preferred embodiment, the at least one dark subpixel that each said pixel has is the only dark subpixel of that pixel.

In yet another preferred embodiment, the area of the at least one dark subpixel is at least three times as large as that of the at least one bright subpixel.

Still another liquid crystal display device according to the present invention includes a plurality of pixels that are arranged in matrix so as to form a plurality of rows extending in an X direction and a plurality of columns extending in a Y direction. Each said pixel includes a liquid crystal layer and a plurality of electrodes for applying a voltage to the liquid crystal layer, and is split into at least one bright subpixel, which has a luminance higher than a certain luminance produced by a display signal voltage supplied, and at least one dark subpixel that has a lower luminance than the certain luminance. The area of the at least one bright subpixel is smaller than that of the at least one dark subpixel. If the at least one bright subpixel and the at least one dark subpixel are arranged in the Y direction in each said pixel, two closest pixels that belong to the same row to display the same color have geometric centroids with the same Y coordinate. The greatest difference between the Y coordinates of luminance centroids is equal to or smaller than a half of the length $R_Y$ of the two pixels as measured in the Y direction. Or if the at least one bright subpixel and the at least one dark subpixel are arranged in the X direction in each said pixel, two pixels that are adjacent to each other in the column direction have geometric centroids with the same X coordinate. The greatest difference between the X coordinates of luminance centroids is equal to or smaller than a half of the length $R_X$ of the two pixels as measured in the X direction.

In one preferred embodiment, the at least one bright subpixel that each said pixel has is the only bright subpixel of that pixel.

In another preferred embodiment, the luminance centroids of the bright subpixels of the two pixels have the same Y coordinate.

In still another preferred embodiment, the Y coordinate of the luminance centroid of the only bright subpixel agrees with that of the geometric centroid of the pixel.

In yet another preferred embodiment, the X coordinate of the luminance centroid of the only bright subpixel agrees with that of the geometric centroid of the pixel.

In yet another preferred embodiment, the area of the at least one dark subpixel is at least three times as large as that of the at least one bright subpixel.

According to the present invention, the decrease in display quality due to the shift of luminance centroid can be minimized in a liquid crystal display device with a pixel division structure, thus providing a liquid crystal display device t h at realizes high definition display. Particularly when the pixel division technique is applied, the display quality of a VA-mode liquid crystal display device can be improved with the viewing angle dependence of the γ characteristic reduced.

BRIEF DESCRIPTION OF THE DRAWINGS

FIG. 15(a) shows a sample image presented on a liquid crystal display device without shifting the pixel center, and FIGS. 15(b) and 15(c) show sample images presented on the liquid crystal display device with the pixel center shifted.

FIGS. 16(a) and 16(b) show specific examples of pixel structures corresponding to the pixel arrangement shown in FIG. 11(a).

DETAILED DESCRIPTION OF PREFERRED EMBODIMENTS

Figure 1:
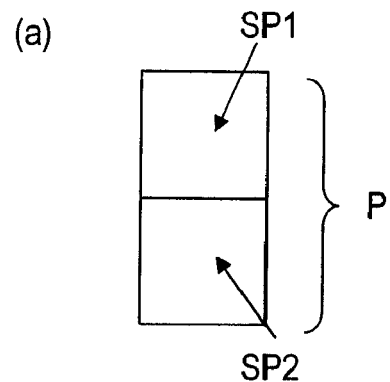
FIG. 1(a) is a schematic representation showing the pixel division structure of a liquid crystal display device according to a preferred embodiment of the present invention.
FIG. 1(b) is a schematic representation showing a normal pixel.
Figure 2:
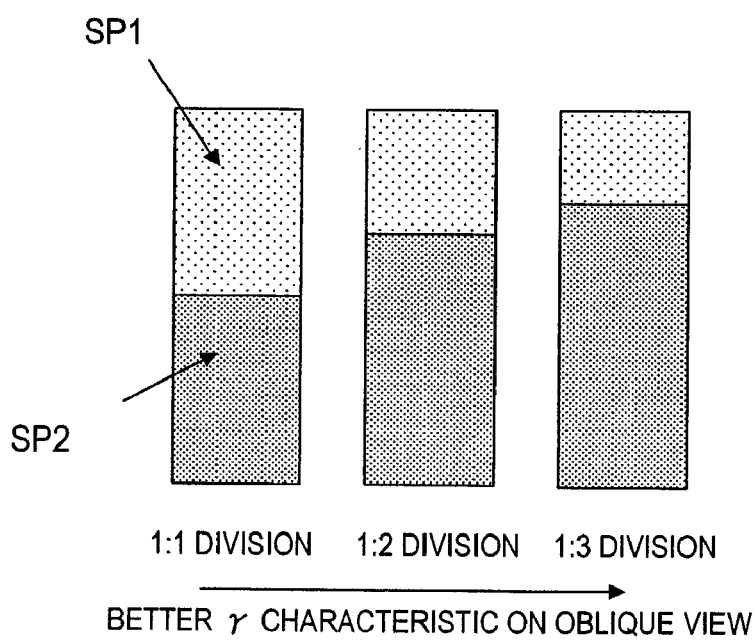
FIG. 2 is a schematic representation showing how the γ characteristic when the screen is viewed obliquely improves if the area of a bright subpixel SP1 is smaller than that of a dark subpixel SP2.
Figure 3:
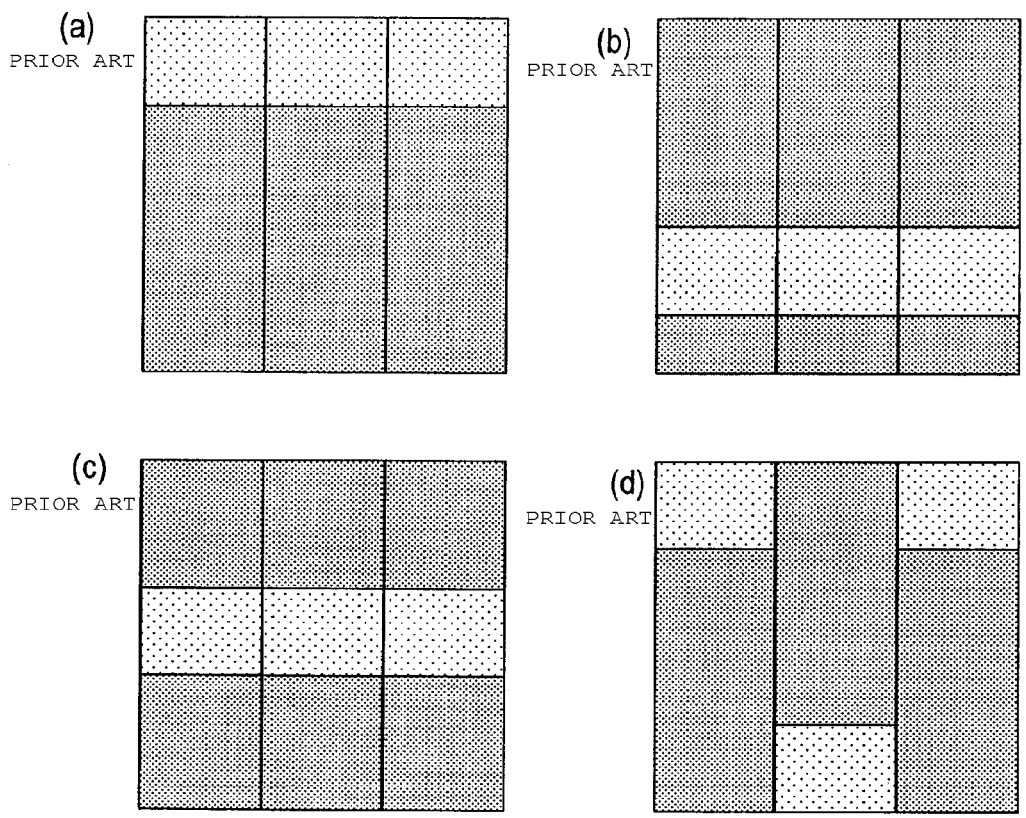
FIGS. 3(a) through 3(d) are schematic representations showing various alternative arrangements of subpixels in a two-subpixel structure in which a pixel is split into a bright subpixel and a dark subpixel with an area ratio of one to three.

The present inventors discovered that the problem of image blurring or pseudo contour appearing, observed when the area ratio of the bright subpixels to the dark subpixels is uneven (particularly when the combined area of the bright subpixels is greater than that of the dark subpixels) as shown in FIG. 3(d), was caused due to shifting of the luminance centroid of a pixel with the gray scale to be displayed, thus acquiring the basic idea of the present invention.

Figure 4:
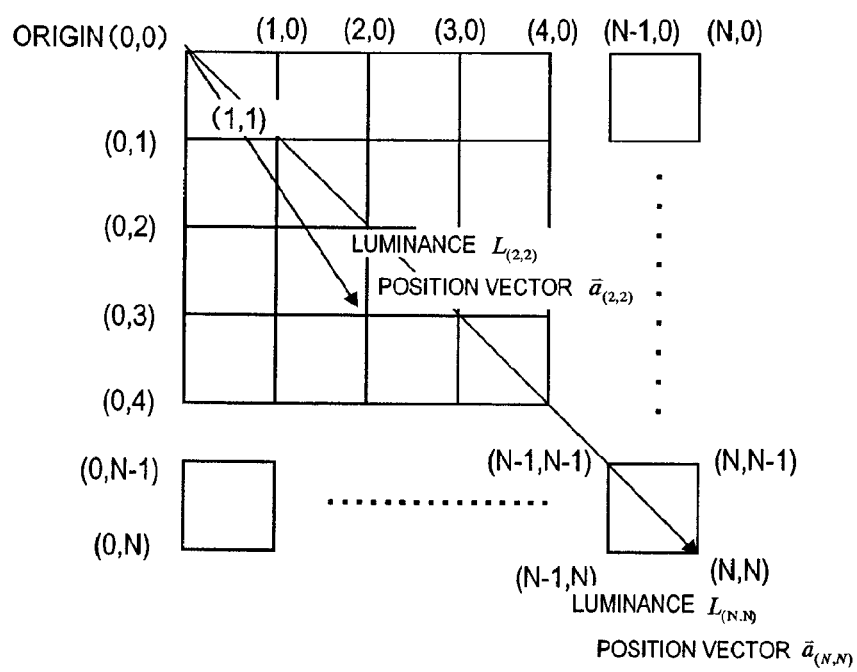
FIG. 4 shows how to define the luminance centroid of a pixel.

First, the "luminance centroid" of a pixel will be defined with reference to FIG. 4.

Suppose there are N×N lattice points on a pixel as shown in FIG. 4 and the luminance centroid G is obtained by dividing the sum of the products of the position vectors from the origin to respective lattice points and the luminances of those lattice points by the sum of the luminances of all lattice points.

In that case, the luminance centroid G is given by the following Equation (1):

$$G = \frac{L_{(0,0)}a_{(0,0)} + L_{(1,0)}a_{(1,0)} + L_{(0,1)}a_{(0,1)} + \ldots + L_{(N,N)}a_{(N,N)}}{L_{(0,0)} + L_{(1,0)} + L_{(0,1)} + \ldots + L_{(N,N)}} \quad (1)$$

$$= \frac{\sum_{x=0}^{x=N}\left[\sum_{y=0}^{y=N} L_{(x,y)} \times a_{(x,y)}\right]}{\sum_{x=0}^{x=N}\left[\sum_{y=0}^{y=N} L_{(x,y)}\right]}$$

where Y, X=0, 1, 2, 3, . . . and N and the magnitude of N (which is an integer that is equal to or greater than one) and the shape of each unit cell (i.e., a rectangle to be defined by four lattice points) may be appropriately determined by the size, shape and arrangement of the subpixels. In this example, the lattice is supposed to consist of N×N lattice points for the sake of simplicity. However, the two Ns may be determined independently of each other. In that case, the lattice may be represented as consisting of N×M lattice points, in which there are N lattice points in the x direction and M lattice points in the y direction, respectively. The same statement also applies even if each pixel is divided into N×M unit cells and the centroid of each unit cell is represented by a position vector.

In a liquid crystal display device of this example, pixels are supposed to be arranged in matrix consisting of a number of rows extending in an X direction and a plurality of columns extending in a Y direction (i.e., the data line direction). The X direction is the scan line direction (which is typically the horizontal direction) while the Y direction is the data line direction (which is typically the vertical direction).

Figure 5:
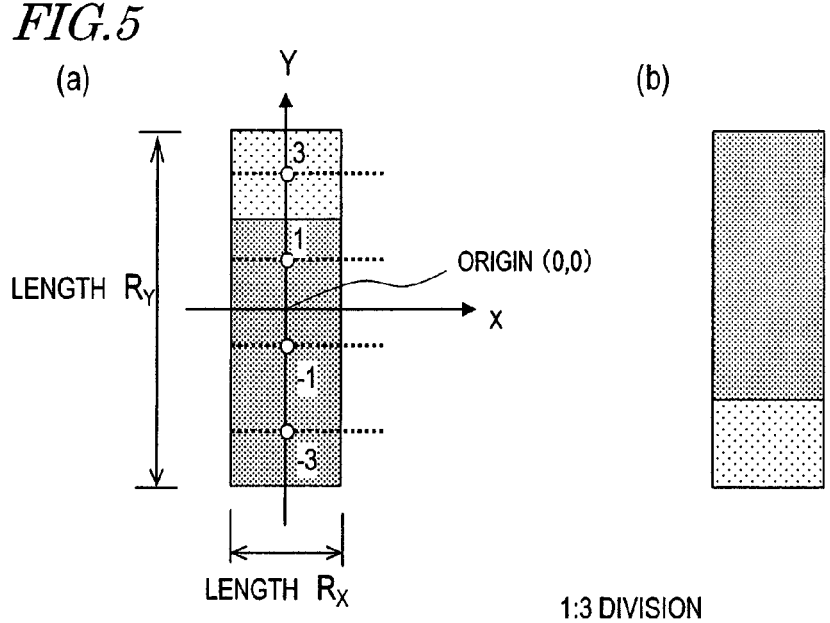
FIGS. 5(a) and 5(b) shows how to figure out (the Y coordinate of) the luminance centroid of a pixel in the Y direction that has been split into a bright subpixel and a dark subpixel with an area ratio of one to three.

Let us calculate the luminance centroid G of a pixel in which the bright subpixels and dark subpixels have an area ratio of one to three, for example. A pixel that has an area ratio of one to three and that has been split into two (i.e., one bright subpixel and one dark subpixel) in the Y direction is shown in FIG. 5. These subpixels are arranged symmetrically with respect to the line that equally divides the length $R_X$ of the picture element in the X direction. And the luminance centroid is located on that line. That is why only the luminance centroid position in the Y direction needs to be considered.

The luminance centroid position in the Y direction (i.e., the Y coordinate of the luminance centroid) can be given by the following Equation (2):

$$G = \frac{\sum_{y=0}^{y=N}[L_{(0,y)} \times a_{(0,y)}]}{\sum_{y=0}^{y=N} L_{(0,y)}} \quad (2)$$

where y=0, 1, 2, 3 . . . and N.

More specifically, suppose the pixel has been split into two such that the area ratio of the bright subpixel to the dark subpixel is one to three as shown in FIG. 5(a). And also suppose this pixel is equally divide into four cells in the Y direction and draw a 4×1 lattice with the respective centers of the cells set as base points. Also, to compare this pixel to a neighboring pixel that is adjacent to the pixel in the row direction (which is the closest pixel that belongs to the same row and that displays the same color in a color display device unless otherwise stated), the origin is supposed to be located at the halfway point of the length $R_Y$ in the Y direction of the pixel in question.

In that case, the luminance centroid of the pixel is given by the following Equation (3):

$$G = R \times \frac{1}{8} \times \frac{\sum_{y=-3}^{y=3}[L_{(0,y)} \times a_{(0,y)}]}{\sum_{y=-3}^{y=3} L_{(0,y)}} \quad (3)$$

where y=−3, −1, 1, and 3.

Supposing the luminance of the bright subpixel is $L_l$ and the luminance of the dark subpixel is $L_d$, Equation (3) can be modified into the following Equation (4-1):

$$G = R \times \frac{3}{8} \times \frac{L_l - L_d}{L_l + L_d} \quad (4\text{-}1)$$

On the other hand, if the bright subpixel and the dark subpixel are arranged in reverse order vertically (i.e., in the Y direction) as shown in FIG. 5(b), the luminance centroid position is given by the following Equation (4-2):

$$G = R \times \frac{3}{8} \times \frac{L_d - L_l}{L_l + L_d} \quad (4\text{-}2)$$

Next, the pixel division structure will be described. Various arrangements have been proposed so far to provide a plurality of subpixels with mutually different luminances. The liquid crystal display device of this preferred embodiment is a VA-mode LCD with the pixel division structure disclosed in Patent Document No. 1.

Figure 6:
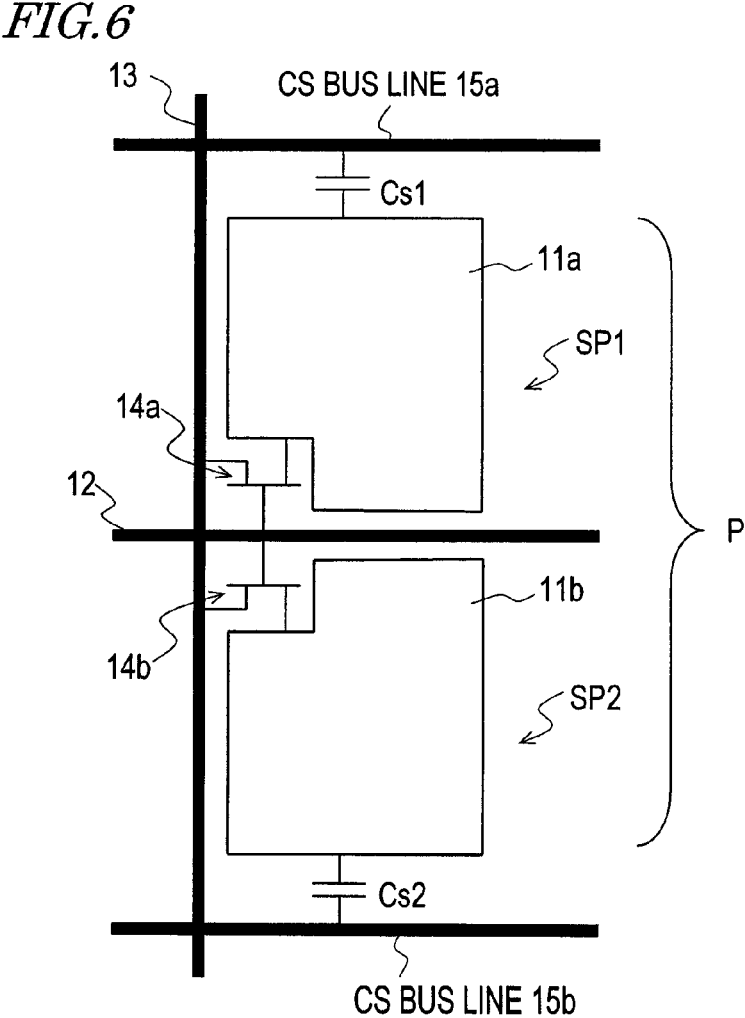
FIG. 6 schematically shows the electrical configuration of a pixel in a liquid crystal display device according to a preferred embodiment of the present invention.

FIG. 6 schematically shows an electrical configuration for a pixel in a liquid crystal display device according to a preferred embodiment of the present invention. Although a two-subpixel structure is shown in FIG. 6, the present invention is in no way limited to this specific preferred embodiment.

As shown in FIG. 6, the pixel P is divided into a subpixel SP1 and another subpixel SP2. To the subpixel electrodes 11a and 11b of the subpixels SP1 and SP2, connected are their associated TFTs 14a and 14b and their associated storage capacitors CS1 and CS2, respectively. The gate electrodes of the TFTs 14a and 14b are both connected to the same gate bus line (scan line) 12. And the source electrodes of the TFTs 14a and 14b are connected to the same source bus line (signal line) 13. The storage capacitors CS1 and CS2 are connected to their associated CS bus lines (storage capacitor lines) 15a and 15b, respectively. The storage capacitor CS1 includes a storage capacitor electrode that is electrically connected to the subpixel electrode 11a, a storage capacitor counter electrode that is electrically connected to the CS bus line 15a, and an insulating layer (such as a gate insulating film (not shown)) arranged between the electrodes. The storage capacitor CS2 includes a storage capacitor electrode that is electrically connected to the subpixel electrode 11b, a storage capacitor counter electrode that is electrically connected to the CS bus line 15b, and an insulating layer (such as a gate insulating film (not shown)) arranged between the electrodes. The respective storage capacitor counter electrodes of the storage capacitors CS1 and CS2 are independent of each other and have such a structure as receiving mutually different storage capacitor counter voltages (which are also called "CS signals") from the CS bus lines 15a and 15b, respectively.

A display signal voltage is applied through the common source bus line 13 to the subpixel electrodes 11a and 11b to turn the TFTs 14a and 14b OFF. After that, if the voltages applied to the storage capacitor counter electrodes of the storage capacitors CS1 and CS2 (through the CS bus lines 15a and 15b, respectively) are varied in different directions and to different degrees, then the effective voltages applied to the liquid crystal capacitances of the subpixels SP1 and SP2 (i.e., the luminances) will be different from each other. By adopting this configuration, the display signal voltage can be applied through the single source bus line 13 to the two subpixels SP1 and SP2. Consequently, the subpixels SP1 and SP2 can have mutually different luminances without increasing the number of source bus lines or source drivers.

Figure 7:
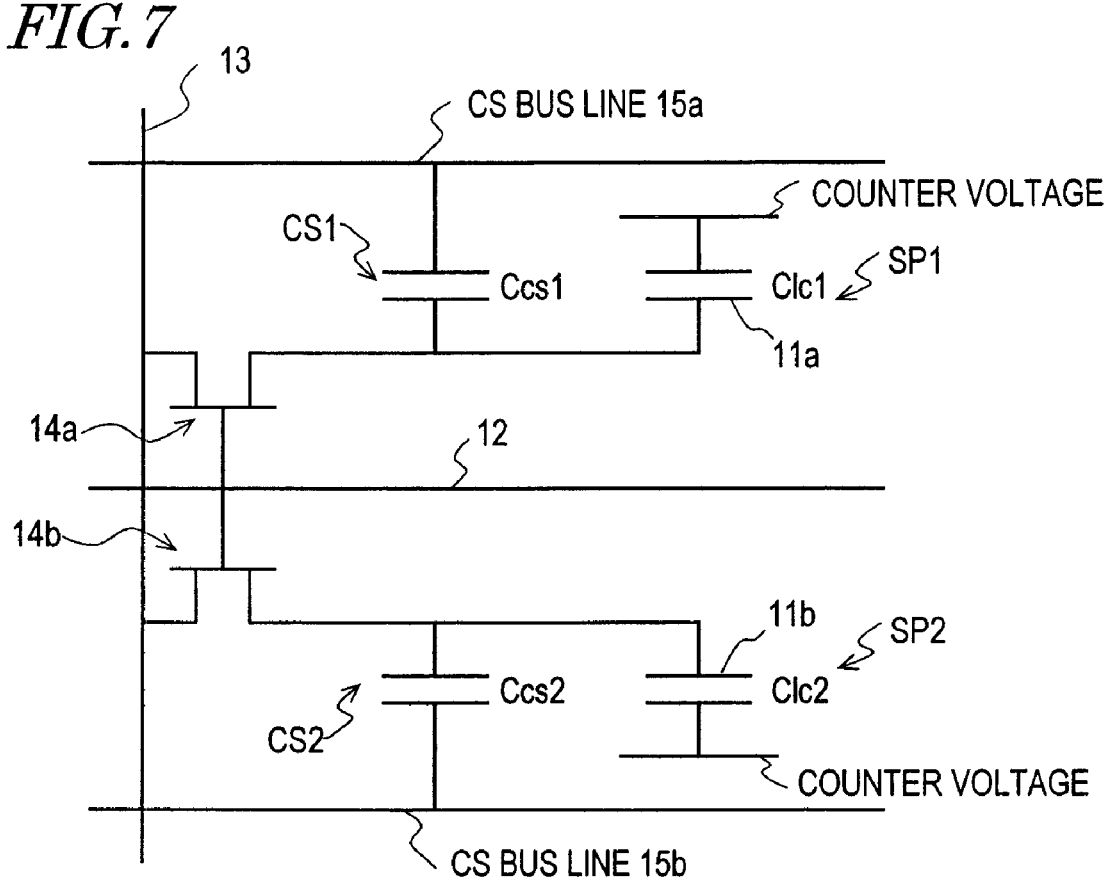
FIG. 7 shows an equivalent circuit of the liquid crystal display device according to the preferred embodiment of the present invention.

Hereinafter, a method for driving this liquid crystal display device will be described with reference to the equivalent circuit diagram shown in FIG. 7 and the voltage waveforms (with application timings) of FIG. 8.

Figure 8:
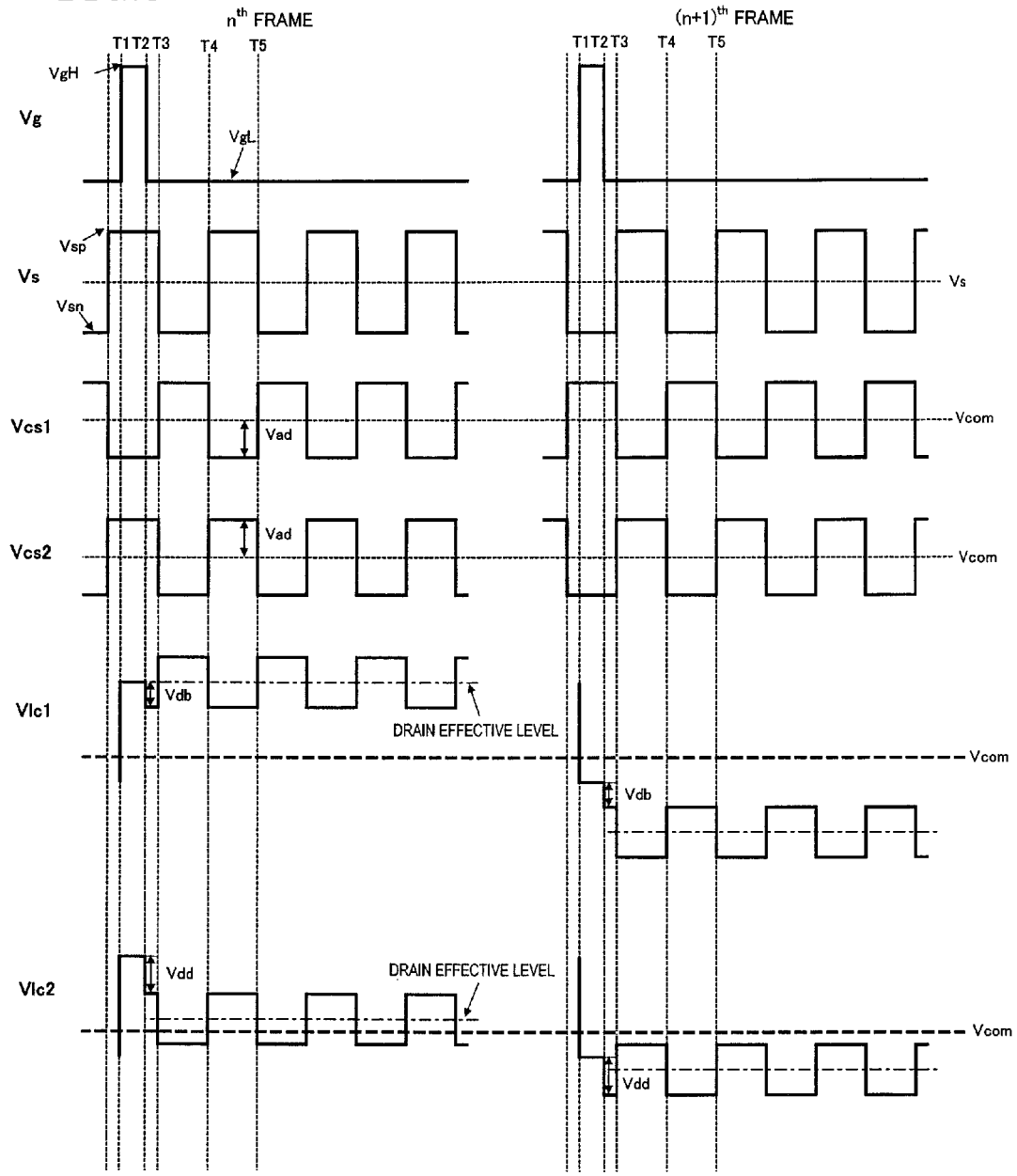
FIG. 8 shows the voltage waveforms of respective signals for driving the liquid crystal display device shown in FIG. 7 and their application timings.

In the voltage waveform diagram shown in FIG. 8, the subpixel SP1 is the bright subpixel, the subpixel SP2 is the dark subpixel, Vg denotes the gate voltage, Vs denotes the source voltage, Vcs1 and Vcs2 denote the voltages applied to the storage capacitors of the subpixels SP1 and SP2, and Vlc1 and Vlc2 denote the voltages applied to the pixel electrodes of the subpixels SP1 and SP2, respectively. In general, alternate current drive such as frame inversion, line inversion or dot inversion is carried out so as not to produce polarization in the liquid crystal layer.

In this preferred embodiment, a source voltage Vsp is applied in the $n^{th}$ frame as a positive source voltage with respect to the center value Vsc of the source voltage, a source voltage Vsn is applied in the next $(n+1)^{th}$ frame as a negative source voltage with respect to the center value Vsc of the source voltage, and the dot inversion is carried out every frame as shown in FIG. 8. To CS1 and CS2, signals, of which the voltages oscillate with the amplitude Vad and which have a phase difference of 180 degrees, are input.

Hereinafter, it will be described with reference to FIG. 8 how the voltages of respective signals change in the $n^{th}$ frame with time.

First, at a time T1, Vg rises from VgL to VgH to turn the TFTs of the two subpixels ON. As a result, the subpixels SP1 and SP2 and the storage capacitors CS1 and CS2 are charged with the voltage Vsp.

Next, at a time T2, Vg falls from VgH to VgL to turn the TFTs of the two subpixels OFF and electrically isolate the subpixels SP1 and SP2 and the storage capacitors CS1 and CS2 from the source bus line. It should be noted that immediately after that, feedthrough voltages Vdb and Vdd are generated in the subpixels SP1 and SP2, respectively, due to the feedthrough phenomenon caused by a parasitic capacitance, for example. As a result, the voltages applied to the respective subpixels now are:

$$Vlc1=Vsp-Vdb$$

$$Vlc2=Vsp-Vdd$$

respectively.

Also, in this case, $$Vcs1=Vcom-Vad$$

$$Vcs2=Vcom+Vad$$

are satisfied.

The feedthrough voltages Vdb and Vdd are given by:

$$Vdb, Vdd=(Vgh-Vgl) \times Cgd/(Clc(V)+Cgd+Ccs)$$

where Vgh and Vgl are voltages applied to the gates of the TFTs to turn them ON and turn them OFF, respectively, Cgd is the parasitic capacitance generated between the gate and drain of the TFTs, Clc (V) is the electrostatic capacitance (value) of the liquid crystal capacitors, and Ccs is the electrostatic capacitance (value) of the storage capacitors.

Next, at a time T3, the voltage Vcs1 on the storage capacitor bus line CS1 rises from Vcom−Vad to Vcom+Vad and the voltage Vcs2 on the storage capacitor bus line CS2 falls from Vcom+Vad to Vcom−Vad. In this case, the pixel voltages Vlc1 and Vlc2 applied to the respective subpixels are:

$$Vlc1=Vsp-Vdb+2 \times K \times Vad$$

$$Vlc2=Vsp-Vdd-2 \times K \times Vad$$

respectively, where K=Ccs/(Clc(V)+Ccs).

Next, at a time T4, Vcs1 falls from Vcom+Vad to Vcom−Vad and Vcs2 rises from Vcom−Vad to Vcom+Vad. In this case, the subpixel voltages Vlc1 and Vlc2 are:

$$Vlc1=Vsp-Vdb$$

$$Vlc2=Vsp-Vdd$$

respectively.

Next, at a time T5, Vcs1 rises from Vcom−Vad to Vcom+Vad and Vcs2 falls from Vcom+Vad to Vcom−Vad. In this case, the subpixel voltages Vlc1 and Vlc2 are:

$$Vlc1=Vsp-Vdb+2 \times K \times Vad$$

$$Vlc2=Vsp-Vdd-2 \times K \times Vad$$

respectively.

After that, until writing is performed when Vg=Vgh, the voltages Vcs1, Vcs2, Vlc1 and Vlc2 alternate their levels at the times T4 and T5 every time a period of time that is an integral number of times as long as one horizontal scanning period 1H has passed. Consequently, the effective values of Vlc1 and Vlc2 become:

$$Vlc1=Vsp-Vdb+K \times Vad$$

$$Vlc2=Vsp-Vdd-K \times Vad$$

respectively.

In the $n^{th}$ frame, the effective voltages applied to the liquid crystal layer of the respective subpixels are:

$$V1=Vsp-Vdb+K \times Vad-Vcom$$

$$V2=Vsp-Vdd-K \times Vad-Vcom$$

Consequently, the subpixel SP1 becomes the bright subpixel and the subpixel SP2 becomes the dark subpixel.

Hereinafter, it will be described how the voltages of respective signals change in the $(n+1)^{th}$ frame with time.

In the $(n+1)^{th}$ frame, the polarity is inverted, and therefore, Vs is inverted, too. For that purpose, at the time T1, Vg rises from VgL to VgH to turn the TFTs of the two subpixels ON. As a result, the storage capacitors CS1 and CS2 are charged with the voltage Vsn.

Next, at the time T2, the TFTs of the two subpixels are turned OFF and immediately after that, feedthrough voltages Vdb and Vdd are generated in the subpixels SP1 and SP2, respectively, as in the $n^{th}$ frame. As a result, the voltages applied to the respective subpixels now are:

$$Vlc1=Vsn-Vdb$$

$$Vlc2=Vsn-Vdd$$

Next, at the time T3, the voltage Vcs1 on the storage capacitor bus line CS1 falls from Vcom+Vad to Vcom−Vad and the voltage Vcs2 on the storage capacitor bus line CS2 rises from Vcom−Vad to Vcom+Vad. In this case, the pixel voltages Vlc1 and Vlc2 applied to the respective subpixels are:

$$Vlc1=Vsn-Vdb-2 \times K \times Vad$$

$$Vlc2=Vsn-Vdd+2 \times K \times Vad$$

Next, at the time T4, Vcs1 rises from Vcom−Vad to Vcom+Vad and Vcs2 falls from Vcom+Vad to Vcom−Vad. In this case, the subpixel voltages Vlc1 and Vlc2 are:

$$Vlc1=Vsn-Vdb$$

$$Vlc2=Vsn-Vdd$$

respectively.

Next, at the time T5, Vcs1 rises from Vcom−Vad to Vcom+Vad and Vcs2 falls from Vcom+Vad to Vcom−Vad. In this case, the subpixel voltages Vlc1 and Vlc2 are:

$$Vlc1=Vsn-Vdb-2 \times K \times Vad$$

$$Vlc2=Vsn-Vdd+2 \times K \times Vad$$

respectively.

After that, the voltages Vcs1, Vcs2, Vlc1 and Vlc2 alternate their levels at the times T4 and T5 as in the $n^{th}$ frame. Consequently, the effective values of Vlc1 and Vlc2 become:

$$Vlc1=Vsn-Vdb-K \times Vad$$

$$Vlc2=Vsn-Vdd+K \times Vad$$

respectively.

In the (n+1)$^{th}$ frame, the effective voltages applied to the liquid crystal layer of the respective subpixels are:

$$V1 = Vsn - Vdb - K \times Vad - Vcom$$

$$V2 = Vsn - Vdd + K \times Vad - Vcom$$

Consequently, the subpixel SP1 becomes the bright subpixel and the subpixel SP2 becomes the dark subpixel.

Figure 9:
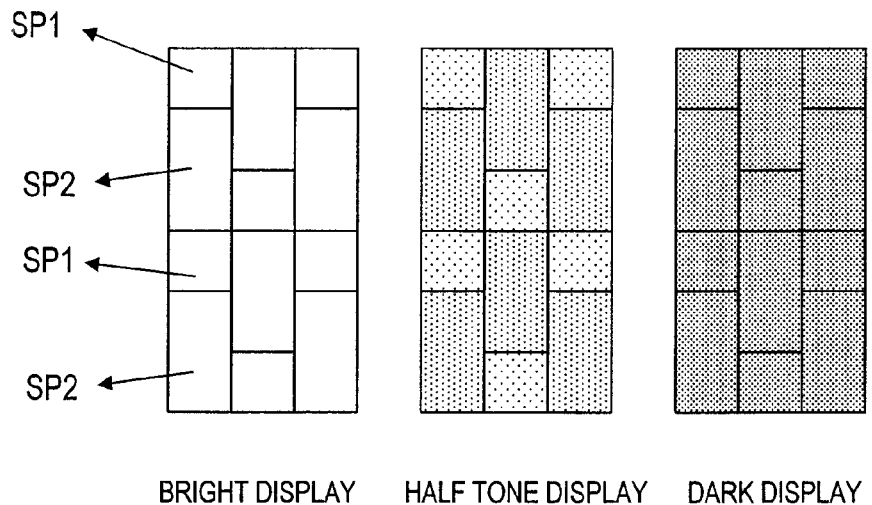
FIG. 9 is a schematic representation showing how the difference in luminance between bright and dark subpixels depends on the gray scale.

Also, according to the pixel division structure disclosed in Patent Document No. 1, there is almost no difference in luminance between bright and dark subpixels in low gray scale tone (i.e., low luminance) and high gray scale tone (i.e., high luminance) displays, but there is a difference in luminance between bright and dark subpixels in a half tone display as schematically shown in FIG. 9, thus reducing the viewing angle dependence of the γ characteristic effectively in a half tone display in the VA mode, in particular.

Next, it will be described how the luminance centroid of a pixel shifts according to the gray scale tone being displayed by the liquid crystal display device of this preferred embodiment with such a pixel division structure. In the following example, the area ratio of the bright subpixel to the dark subpixel is supposed to be one to three as shown in FIGS. 5(a) and 5(b).

Figure 10:
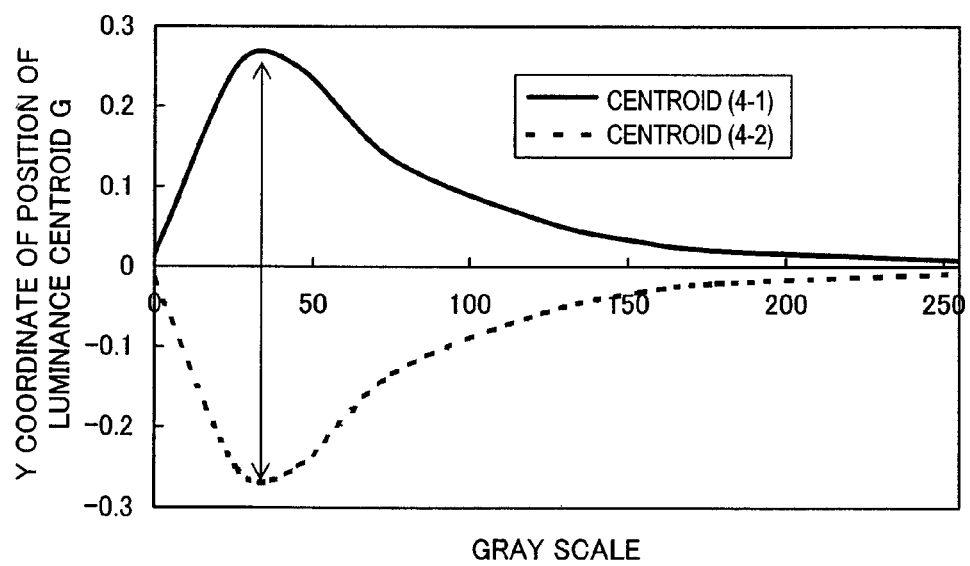
FIG. 10 is a graph showing the gray scale dependence of the luminance centroid of the pixel shown in FIGS. 5(a) and 5(b).

As described above, the luminance centroid position of the pixel shown in FIGS. 5(a) and 5(b) can be figured out by Equations (4-1) and (4-2). FIG. 10 shows the positions of the luminance centroids G that were figured out by those equations for respective gray scales (i.e., the gray scale tones to be displayed as defined by the display signal voltage being applied). In FIG. 10, the abscissa represents the gray scale tone to be displayed. In this case, there are 256 gray scales ranging from gray scale 0 corresponding to black display and gray scale 255 corresponding to white display with the highest luminance. On the other hand, the ordinate represents the Y coordinate of the luminance centroid that has been normalized with the length $R_Y$ of the pixel in the Y direction. The origin (with a value of zero) on the axis of ordinates is a point that equally splits the length $R_Y$ of the pixel into two in the Y direction (see FIG. 5(a)).

As can be seen from FIG. 10, when a low (or dark) gray scale tone or a high (or bright) gray scale tone is displayed, the luminance centroid G almost corresponds with the geometric centroid of the pixel, which is the origin of the Y coordinates in this example and which will sometimes be referred to herein simply as a "pixel center". In half tones, however, the luminance centroid G shifts toward the bright subpixel. From around gray scale 25 to around gray scale 50, the luminance centroid G shifts by as much as about a fourth of the length $R_Y$ of the pixel in the Y direction. That is to say, the luminance centroid G of a pixel would shift from the pixel center (when either a low gray scale tone or a high gray scale tone is displayed) to the point that is $R_Y/4$ away from the pixel center (when approximately gray scale 35 is displayed in the example shown in FIG. 10).

As shown in FIGS. 3(d) and 9, in the checkered pattern in which the positions of the bright and dark subpixels are interchanged (or the order of magnitudes of the subpixel luminances is reversed) between pixels that are adjacent to each other in the row direction, the biggest difference ΔYall in Y coordinate between the pixel centers of pixels that are adjacent to each other in the row direction could exceed a half of the length $R_Y$ of the pixel in the Y direction as shown in FIG. 10. That is to say, the difference ΔYall could be twice as large as the maximum shift of the luminance centroid G within a single pixel.

If the subpixels are arranged so as to form such a pattern in the column direction (i.e., in the Y direction), the luminance centroids G of pixels that are adjacent to each other in the row direction (i.e., in the X direction) will have significantly different Y coordinates, thus making the image look blurred or producing a zigzag line (a pseudo contour) in the row direction. This problem could arise not just when the bright and dark subpixels have an area ratio of one to three but also when the subpixels have any other area ratio.

However, in the liquid crystal display device disclosed in Patent Document No. 1 in which a pixel is evenly split into a bright subpixel and a dark subpixel with an area ratio of one to one and in which the pixels are arranged in the checkered pattern, neither image blurring nor pseudo contour forming was observed. This is probably because according to this arrangement, the biggest difference in luminance centroid G between pixels that are adjacent to each other in the row direction never exceeds a half of the length $R_Y$ of the pixels in the column direction. Specifically, in two pixels that are adjacent to each other in the row direction, the Y coordinates of the luminance centroids of their bright subpixels have a difference of $R_Y/2$, and therefore, the difference in luminance centroid G never exceeds this value. That is why even in the pixel division structure in which the area ratio of the dark subpixels is increased to improve the γ characteristic, if the Y coordinates of the luminance centroids of bright subpixels have a difference ΔY1 of $R_Y/2$ or less in two pixels that are adjacent to each other in the row direction, then the problem described above could be avoided. Naturally, the Y coordinates of the pixel centers should also have a difference ΔYall of $R_Y/2$ or less in two pixels that are adjacent to each other in the row direction. If both ΔY and ΔYall are equal to or smaller than $R_Y/2$, then the Y coordinates of luminance centroids will have a difference of $R_Y/2$ or less in every pair of pixels that are adjacent to each other in the row direction at all gray scale tones.

Next, it will be described how much the pixel centers should be shifted to make the difference ΔY1 between the Y coordinates of the luminance centroids of bright subpixels equal to or smaller than $R_Y/2$ in two pixels that are adjacent to each other in the row direction. As can be easily seen from the foregoing description, the magnitude of shift of these pixel centers should also be equal to or smaller than $R_Y/2$.

Supposing the bright and dark subpixels have an area ratio of one to N (where N is an integer that is equal to or greater than two), the maximum shift of the luminance centroid G of a pixel with respect to the pixel center as the origin can be given by the following Equation (5) when calculations are done using Equation (2) described above:

$$\Delta Y = \frac{1}{2} \times \left( \frac{2N+1}{N+1} - 1 \right) \quad (5)$$

It should be noted that Equation (5) is satisfied on the supposition that the bright subpixel displays white with the highest luminance and the dark subpixel displays black with the lowest luminance. Actually, however, the bright and dark subpixels have luminances that are smaller than those supposed values. That is why ΔY is actually smaller than that of Equation (5).

Supposing N of Equation (5) is infinity, ΔY=½ (=$R_Y$/2) as can be seen from the following Equation (6):

$$\lim_{N \to \infty} \frac{1}{2} \times \left( \frac{2N+1}{N+1} - 1 \right) = \frac{1}{2} \quad (6)$$

This means the difference in Y coordinate between the center (i.e., the geometric centroid) of an unlimitedly small bright subpixel arranged at one end of a pixel in the Y direction and the pixel center. That is to say, supposing the pixel center is the origin, the maximum shift of the luminance centroid G of the pixel is the difference in Y coordinate between the center of the bright subpixel and the pixel center.

On the other hand, in black and white display modes, the luminance centroid of a pixel substantially agrees with the pixel center. That is why as the centroid of a pixel is shifted, the luminance centroid thereof also shifts accordingly.

Hereinafter, conditions for determining how much the pixel center needs to be shifted will be described with reference to FIGS. 11(a) and 11(b).

As already described with reference to FIG. 3(d), if a number of pixels, each of which has been split into a bright subpixel and an dark subpixel with an area ratio of one to three, are arranged in a checkered pattern in accordance with the disclosure of Patent Document No. 1 (as shown on the left-hand side of FIG. 11(a)), then the image either gets blurred or produces a pseudo contour. This is because the difference between the luminance centroids G of two pixels that are adjacent to each other in the row direction exceeds $R_Y$/2 as shown in FIG. 10. Thus, if the pixel centers that are adjacent to each other in the row direction have a shift of ΔYall (which should be less than $R_Y$/2) and if the difference ΔY1 between the Y coordinates of the respective centers of bright subpixels is also less than $R_Y$/2, then image blurring and pseudo contour forming can be minimized. In this case, since there is only one bright subpixel in a pixel, the center (i.e., the geometric centroid) of the bright subpixel agrees with the luminance centroid thereof.

Figure 11:
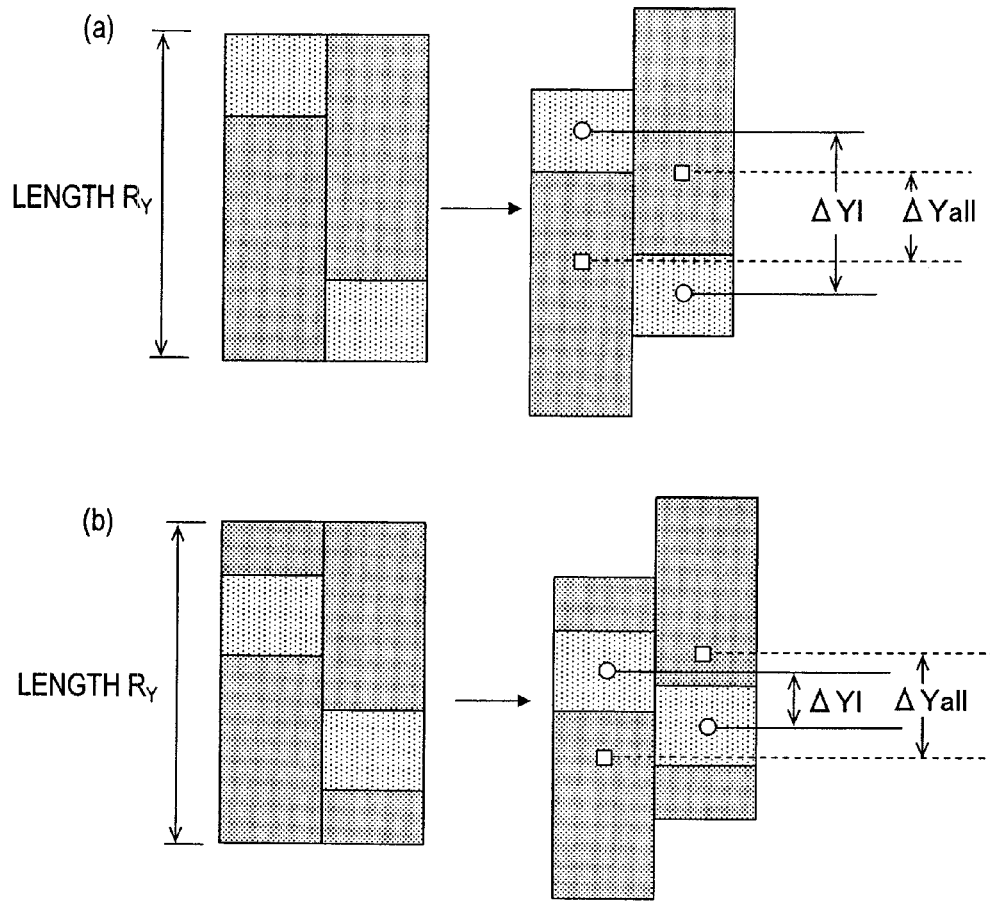
FIGS. 11(a) and 11(b) are schematic representations showing conditions for determining the magnitude of shift between pixel centers.

The same statement applies not only to this example but also to the situation where bright and dark subpixels are arranged as shown in FIG. 11(b).

Furthermore, if there are two or more bright subpixels, then the luminance centroid of the bright subpixels does not agree with the center (i.e., the geometric centroid) thereof. Even so the luminance centroid of the bright subpixels just needs to satisfy the conditions described above. Nevertheless, if a plurality of bright subpixels are arranged within a pixel, the distance between the bright subpixels in the pixel needs to be not greater than the distance to the closer bright subpixel in a pixel that is adjacent to that pixel in the column direction. The reason is as follows. Specifically, the bright subpixels should cooperate with the dark subpixel in their own pixel so as to display a predetermined gray scale tone at a prescribed position. However, if the distance between the bright subpixels in the pixel were greater than the distance to a bright subpixel in a pixel that is adjacent to that pixel in the column direction, then the two bright subpixels, belonging to mutually different pixels, would interfere with each other and would display different gray scale tones at different locations, thus making the viewer feel uncomfortable. That is why if a pixel is divided into three or more subpixels, two dark subpixels and only one bright subpixel are preferably provided.

As a specific example, it will be described with reference to FIG. 12 how much the center of a pixel, which has been split into a bright subpixel and a dark subpixel with an area ratio of one to three, needs to be shifted.

The distance from the pixel center to the luminance centroid of the bright subpixel, which can be regarded as the magnitude of the maximum shift of the luminance centroid, is calculated to be (⅜)$R_Y$ according to Equation (5) described above. That is why if the subpixels of pixels that are adjacent to each other in the row direction are interchanged (i.e., arranged in a checkered pattern) as shown on the left-hand side of FIG. 12, then the maximum shift of the luminance centroid between the adjacent pixels will be (¾) $R_Y$, which is greater than $R_Y$/2. To decrease this maximum shift of the luminance centroid to $R_Y$/2 or less, the adjacent pixel centers should be shifted from each other by $R_Y$/4 or more. But the magnitude of the shift between the pixel centers needs to be $R_Y$/2 or less. Therefore, if the magnitude of the shift between the pixel centers is defined within the range of $R_Y$/4 to $R_Y$/2, then the magnitude of shift of the luminance centroid between adjacent pixels can be $R_Y$/2 or less at every gray scale tone. That is to say, in general, the magnitude of shift of the pixel center may be determined so as to be $R_Y$/2 or less such that the difference ΔY in Y coordinate between the center of the bright subpixel and the pixel center is $R_Y$/2 or less when doubled.

Figure 12:
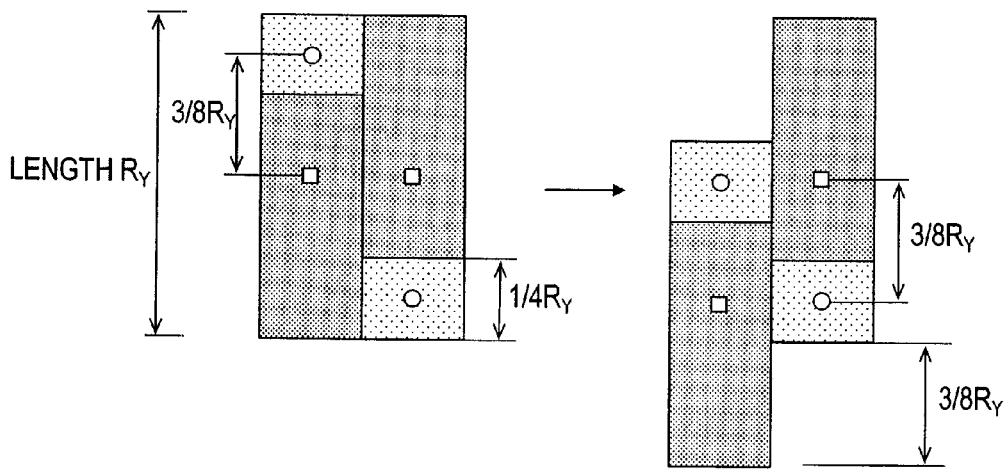
FIG. 12 is a schematic representation showing how much the center of a pixel, which has been split into a bright subpixel and a dark subpixel with an area ratio of one to three, needs to be shifted.
Figure 13:
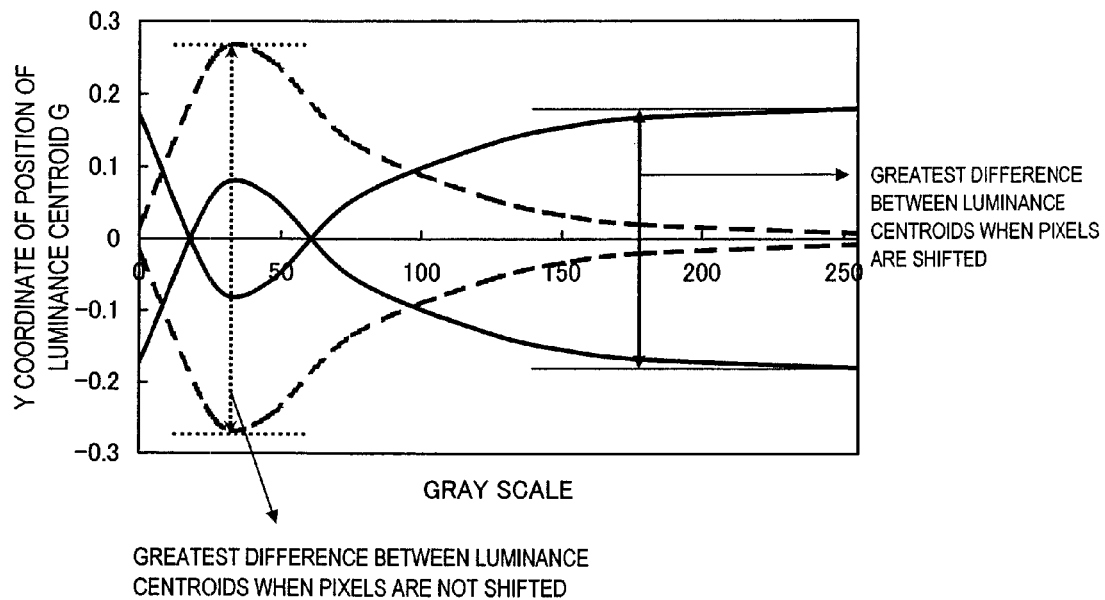
FIG. 13 is a graph showing the gray scale dependences (plotted as solid curves) of the position of the luminance centroid G in a situation where the pixel centers were shifted from each other by (⅜) $R_Y$ in the pixel arrangement shown in FIG. 12.

FIG. 13 shows the gray scale dependences (plotted as solid curves) of the position of the luminance centroid G in a situation where the pixel centers were shifted from each other by (⅜) $R_Y$ in the pixel arrangement shown in FIG. 12. These dependences were calculated as already described with reference to FIG. 10. In FIG. 13, the dashed curve corresponds to that shown in FIG. 10. As can be seen from the solid curves shown in FIG. 13, the maximum shift of the luminance centroid could be decreased to less than approximately 0.4 $R_Y$ by shifting the pixel center by (⅜) $R_Y$. It can also be seen that the maximum shift of the luminance centroid was produced at a higher gray scale, thus making the pseudo contour less perceivable to the viewer's eye. The reason will now be described with reference to FIG. 14.

It is said that although the value may vary to a certain degree from one person to another, the human eyes are unable to recognize a luminance difference when the luminance ratio, defined by the following equation, is 5% or less:

Luminance ratio(%)={(bright luminance−dark luminance)/dark luminance}×100

Figure 14:
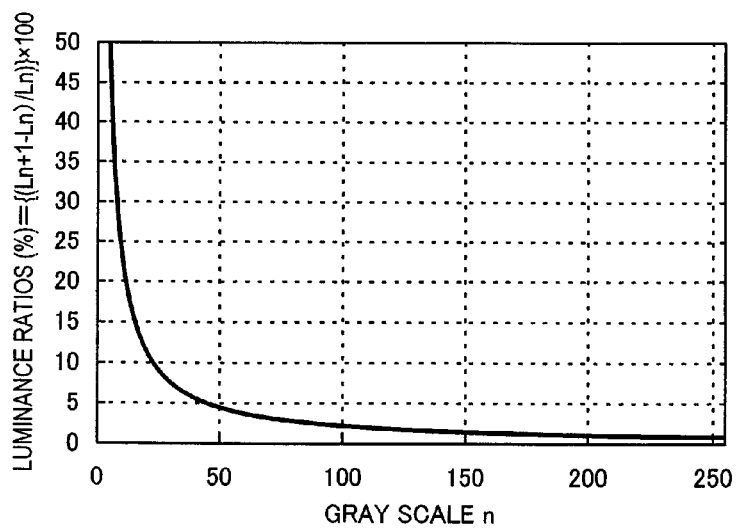
FIG. 14 is a graph plotting the luminance ratios (%) {(Ln+1−Ln)/Ln}×100 for the respective gray scales n.

This means that in a situation where an area (e.g., a square area) with a bright luminance (Ln+1) is displayed on a center area (e.g., a square area) with a dark luminance (Ln) (where n and n+1 are positive integers representing gray scales), if the luminance ratio is 5% or less, then the luminance difference is not recognizable. FIG. 14 is a graph plotting the luminance ratios (%)={(Ln+1−Ln)/Ln}×100 for the respective gray scales n.

As can be seen easily from FIG. 14, the greater the n value (i.e., the higher the luminance), the smaller the luminance ratio. That is why the higher the gray scale that produces the maximum shift of luminance centroid, the less perceivable the pseudo contour.

Next, the effects achieved by shifting the pixel center will be described with reference to FIGS. 15(a) through 15(c). Specifically, FIG. 15(a) shows a sample image presented on a liquid crystal display device without shifting the pixel center as shown on the left-hand side of FIG. 12. FIG. 15(b) shows a sample image presented on the liquid crystal display device with the pixel center shifted by $R_Y$ in the pixel arrangement shown in FIG. 12. And FIG. 15(c) shows a sample image presented on the liquid crystal display device with the pixel center shifted by (⅜) $R_Y$ in the pixel arrangement shown in FIG. 12. The liquid crystal display device used in this example was an MVA mode 32-inch XGA LCD with a pixel size ($R_X \times R_Y$) of 200 μm×600 μm. The display signal voltages V0 and V255 were 0.5 V and 7.2 V, respectively. The CS signal had an amplitude Vadd of 2.5 V. And the parameter K was 0.45.

As shown in FIG. 15(a), unless the pixel center is shifted, the luminance centroids of pixels that are adjacent in the row direction will shift in the column direction (i.e., vertically), thus forming zigzag lines (i.e., pseudo contours) around the eye. In FIGS. 15(b) and 15(c) on the other hand, the luminance centroids shifted to lesser degrees, and therefore, almost no zigzag lines (pseudo contours) were recognized.

Thus, it can be seen that by shifting the pixel center and setting the magnitude of shift between the luminance centroids of pixels that are adjacent in the row direction to be $R_Y/2$ or less, image blurring and pseudo contour forming can be minimized.

Hereinafter, specific structures for the liquid crystal display device of this preferred embodiment that adopts the pixel division structure disclosed in Patent Document No. 1 will be described. In the following examples, the liquid crystal display device is supposed to be an MVA mode LCD. Also, in the drawings to be referred to in the following description, illustrated are the structures of two pixels that are physically adjacent to each other in the row direction. By adopting such a pixel arrangement, if a single color pixel is made up of R, G and B pixels, closest pixels belonging to the same row to display the same color also have the arrangement illustrated in the drawings.

The pixel arrangement shown in FIG. 11(a) may be implemented as the structure shown in FIG. 16(b), which shows the structure of a TFT substrate schematically. In FIG. 16, any component having the same function as the counterpart shown in FIG. 6 is identified by the same reference numeral as that used in FIG. 6. On the other hand, FIG. 16(a) shows a pixel arrangement in a situation where the pixel center is not shifted.

The subpixel electrodes 11a and 11b are connected to the same source bus line 13 by way of their associated TFTs 14a and 14b, respectively, and are supplied with a common display signal voltage (gray scale voltage). The ON and OFF states of the TFTs 14a and 14b are controlled using the same gate bus line 12. The subpixel electrode 11a constitutes a bright subpixel, while the subpixel electrode 11b constitutes a dark subpixel. The subpixel electrode 11b with the greater area is arranged so as to overlap the gate bus line and is connected to upper- and lower-level components through the gate bus line 12. The storage capacitor of the bright subpixel is connected to the CS bus line 15a, while that of the dark subpixel is connected to the CS bus line 15b.

In the MVA-mode LCD of this example, four domains with an equal area are preferably formed such that the alignment directions of liquid crystal molecules are different from one domain to another by 90 degrees. That is why if the pixel division structure is adopted, the four domains preferably have substantially the same area in each of the bright and dark subpixels. For that purpose, in the example illustrated in FIG. 16(a), ribs and slits are arranged differently.

Figure 17:
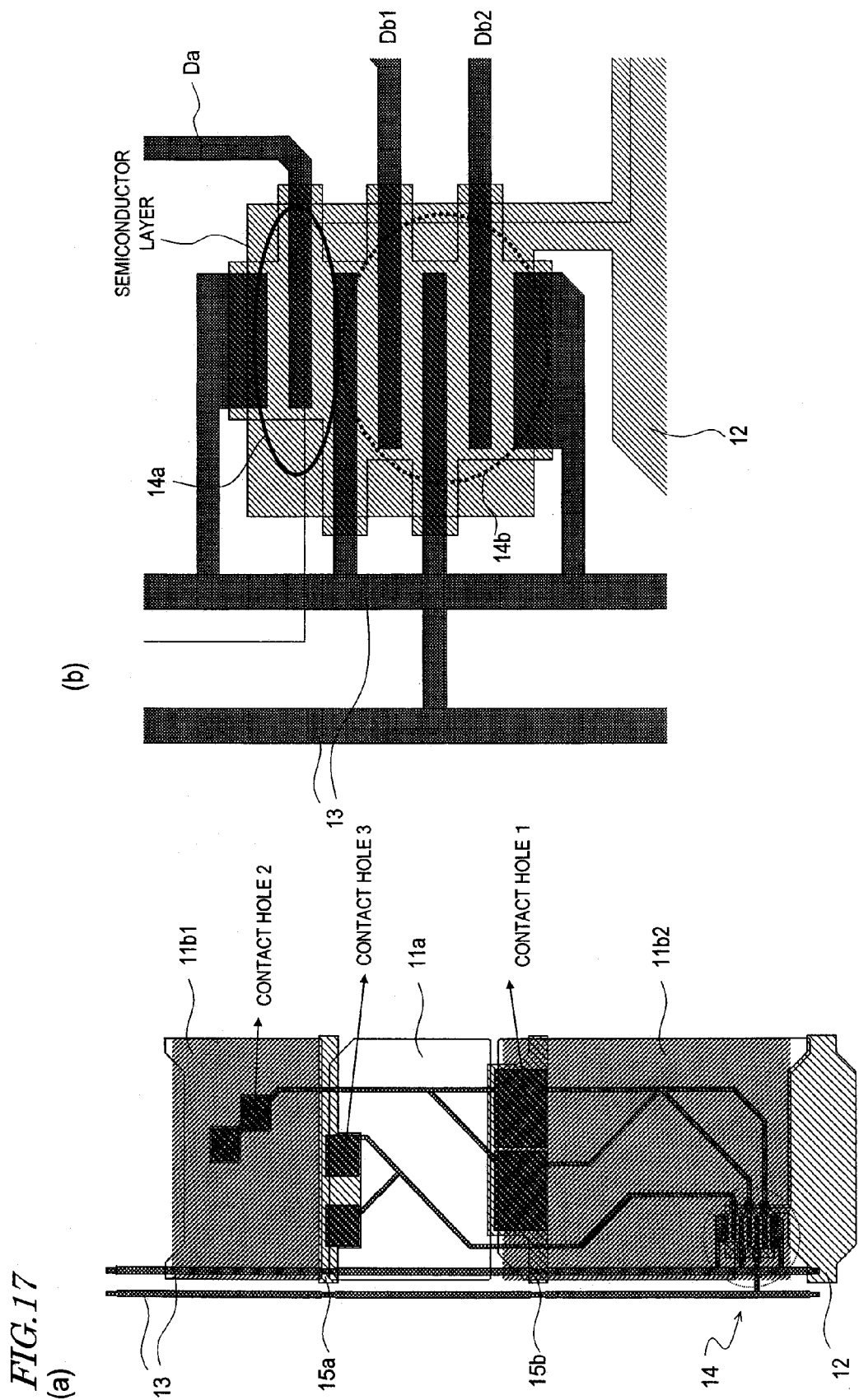
FIG. 17(a) shows a specific example of a pixel structure that implements the pixel arrangement shown in FIG. 11(b) and FIG. 17(b) illustrates the structure of the TFT 14 shown in FIG. 17(a).

Alternatively, the pixel arrangement shown in FIG. 11(b) may be implemented as the structure shown in FIG. 17(a), which also shows the structure of a TFT substrate schematically. In FIG. 17, any component having the same function as the counterpart shown in FIG. 6 is identified by the same reference numeral as that used in FIG. 6.

In the structure shown in FIG. 17(a), a TFT 14a for the subpixel electrode 11a of the bright subpixel and a TFT 14b for the subpixel electrodes 11b1 and 11b2 of the dark subpixel are combined into a single TFT 14. By adopting such a structure, the aperture ratio of the pixel can be increased.

As schematically shown in FIG. 17(b), the TFT 14 includes a semiconductor layer, which is provided in common for both of the two TFTs 14a and 14b. The drain electrode Da is connected to the subpixel electrode 11a through a contact hole 3, while the drain electrodes Db1 and Db2 are connected to the subpixel electrodes 11b1 and 11b2 through contact holes 1 and 2, respectively.

Figure 18:
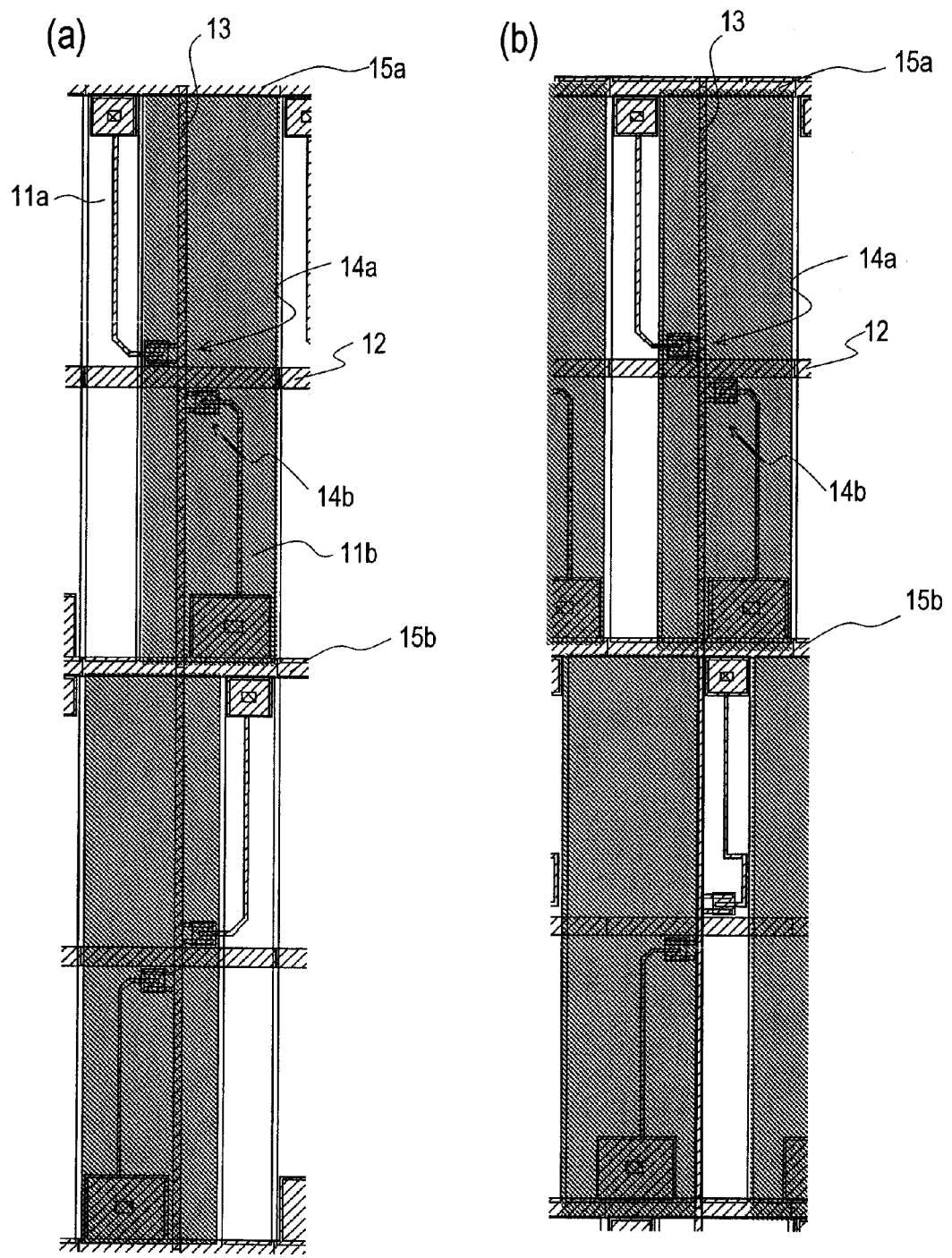
FIG. 18(a) is a schematic representation illustrating an exemplary arrangement in which a pixel has been split in the row direction.
FIG. 18(b) is a schematic representation illustrating an exemplary arrangement in which the geometric centroid of a pixel has been shifted in the row direction.

In the examples described above, a number of subpixels with mutually different luminances are arranged in the column direction. However, the LCD of this preferred embodiment of the present invention is in no way limited to those specific examples. Alternatively, the present invention is naturally applicable to a structure in which subpixels with mutually different luminances are arranged in the row direction. For example, in the structure in which a bright subpixel (subpixel electrode 11a) and a dark subpixel (subpixel electrode 11b) are arranged in the row direction as shown in FIG. 18(a), if the geometric centroid of the pixel is shifted in the row direction as shown in FIG. 18(b), the difference between the luminance centroids is preferably decreased to a half or less of the length $R_X$ of the pixel in the X direction.

Nevertheless, in a pixel (dot), its length $R_Y$ in the column direction is generally about three times greater than its length $R_X$ in the row direction. For that reason, the magnitude of shift of the luminance centroid is greater in the structure in which the pixel has been split in the column direction. That is why the effects of the present invention are achieved more significantly in the structure in which the pixel has been split in the column direction.

The liquid crystal display device of the preferred embodiment described above has a structure in which each pixel has been split in the column direction and in which the geometric centroids of two pixels that are adjacent in the row direction have mutually different Y coordinates such that the greatest difference in Y coordinate between the luminance centroids becomes a half or less of the length $R_Y$ of the two pixels in the Y direction. In the pixels that are adjacent to each other in the row direction, the luminance centroids of their subpixels have mutually different Y coordinates. That is to say, paying attention to a particular row, the luminance centroids of bright subpixels (which agree with their geometric centroids) form a zigzag pattern in the row direction (i.e., the X direction), which corresponds to the checkered pattern arrangement of Patent Document No. 1. According to such an arrangement, bright and dark subpixels are arranged randomly, thus achieving uniform display easily. That is to say, if the arrangements shown in FIGS. 3(a) through 3(c) are adopted, black stripes might be perceived in a half tone display state. However, those stripes can be either reduced significantly or even eliminated according to the present invention.

Nevertheless, if the arrangement described above is adopted, when oblique lines are presented and viewed closer to the screen, colored lines (i.e., pseudo contours) might sometimes be perceived. Those lines are seen probably because the luminance centroids of the bright subpixels are arranged in a zigzag pattern in the row direction and the resultant luminance centroids of the pixels are arranged in a zigzag pattern in the row direction.

To minimize or eliminate such a phenomenon, in the structure in which each pixel has been split in the column direction, the geometric centroids of pixels that are adjacent to each other in the row direction may have the same Y coordinate (i.e., the pixels may be arranged straight in the row direction) such that the greatest difference in Y coordinate between the luminance centroids is a half or less of the length $R_Y$ of the pixel in the Y direction. Furthermore, the luminance centroids of the bright subpixels of the two pixels that are adjacent to each other in the row direction preferably have the same Y coordinate (as in FIGS. 3(a), 3(b) and 3(c)). Among other things, if the Y coordinate of the luminance centroids of the bright subpixels agrees with that of the geometric centroids of the pixels as shown in FIG. 3(c), then the luminance centroids will agree with the geometric centroids of the pixels at every gray scale displayed. As a result, the luminance centroids of the pixels will be arranged straight in line in the row direction at every gray scale displayed, which is a beneficial arrangement.

As can be seen from the foregoing description, a tradeoff is inevitable between the structure for reducing the colored lines (pseudo contours) when oblique lines are presented and the structure for minimizing the generation of black stripes. That is why either of these two structures may be selected appropriately according to the quality of video to be presented, for example. In either case, however, the greatest difference in Y coordinate between the luminance centroids should be equal to or smaller than a half of the length $R_Y$ of the pixels in the Y direction just as described above.

Even in the structure in which the geometric centroids of pixels that are adjacent in the row direction are aligned with each other, the area of the bright subpixel is preferably smaller than that of the dark subpixel and the area of the dark subpixel is preferably three times or more as large as that of the bright subpixel to reduce the viewing angle dependence of the γ characteristic.

Also, as described above, if the distance between the bright subpixels in a pixel were greater than the distance to a bright subpixel in a pixel that is adjacent to that pixel in the column direction, then the two bright subpixels, belonging to mutually different pixels, would interfere with each other and would display different gray scale tones at different locations, thus making the viewer feel uncomfortable. That is why if a pixel is divided into three or more subpixels, two dark subpixels and only one bright subpixel are preferably provided and the only bright subpixel is preferably arranged at the center of the pixel as shown in FIG. 3(c). In the examples described above, each pixel is supposed to be split in the column direction. However, the same statement naturally applies to the structure in which each pixel is split in the row direction.

Hereinafter, specific examples of a liquid crystal display device, in which the geometric centroids of pixels that are adjacent in the row direction are aligned with each other, will be described.

Figure 19:
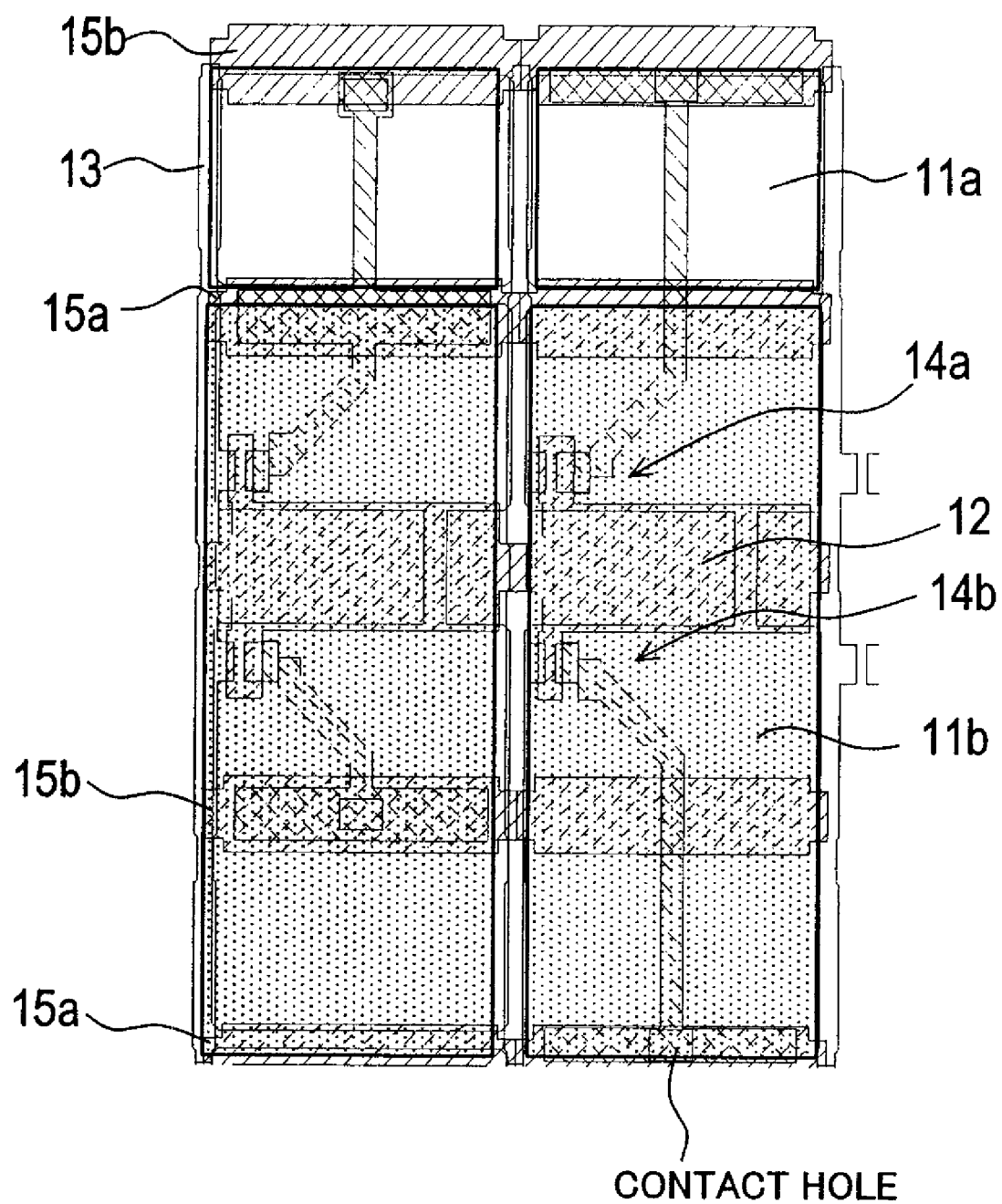
FIG. 19 is a schematic representation illustrating a specific exemplary pixel structure for a liquid crystal display device according to a preferred embodiment of the present invention.

For example, the pixel division structure shown in FIG. 3(a) may be implemented as the structure shown in FIG. 19, which also shows the configuration of a TFT substrate schematically. In FIG. 19, any component having the same function as the counterpart shown in FIG. 6 is identified by the same reference numeral as that used in FIG. 6.

Figure 20:
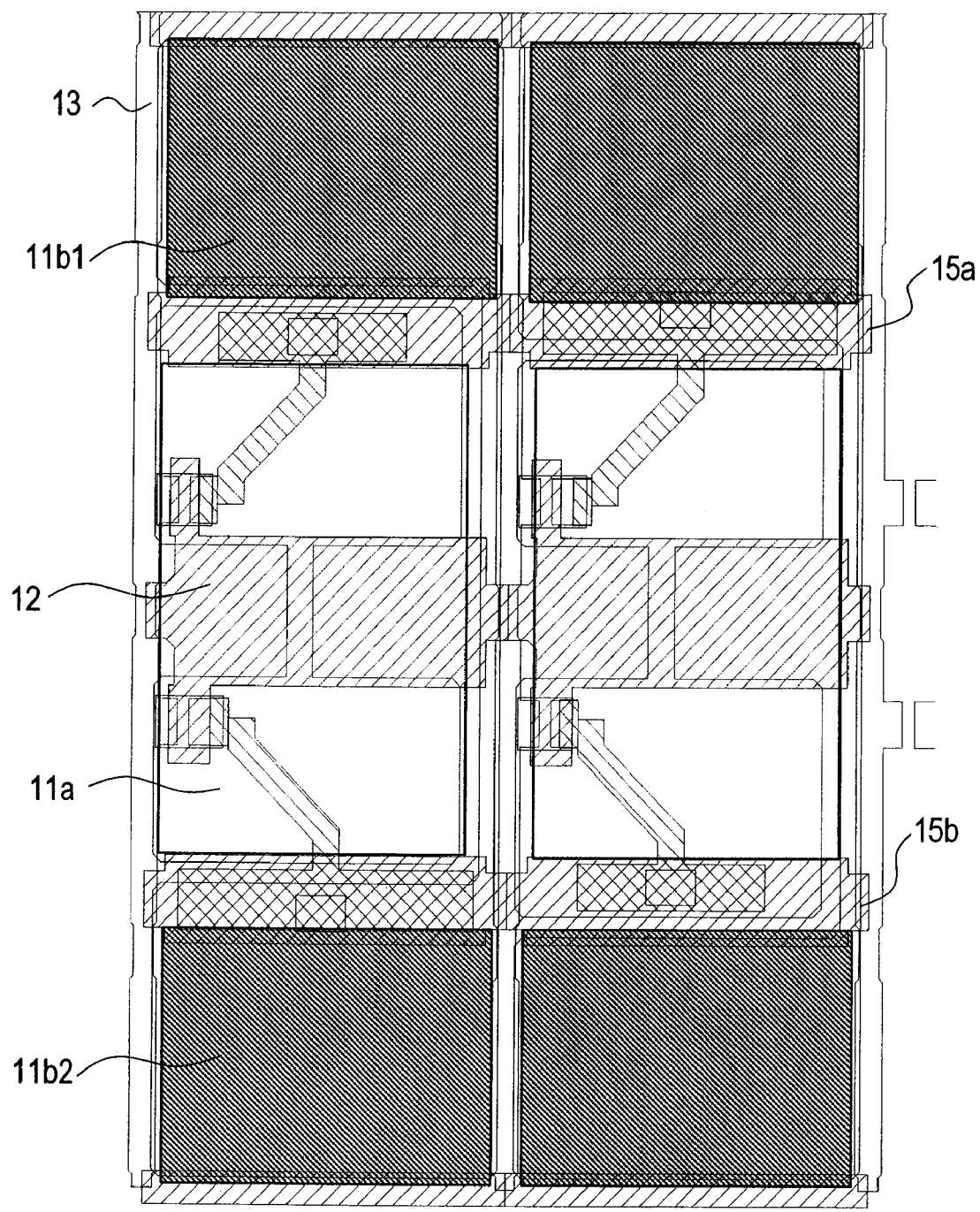
FIG. 20 is a schematic representation illustrating another specific exemplary pixel structure for a liquid crystal display device according to a preferred embodiment of the present invention.
Figure 21:
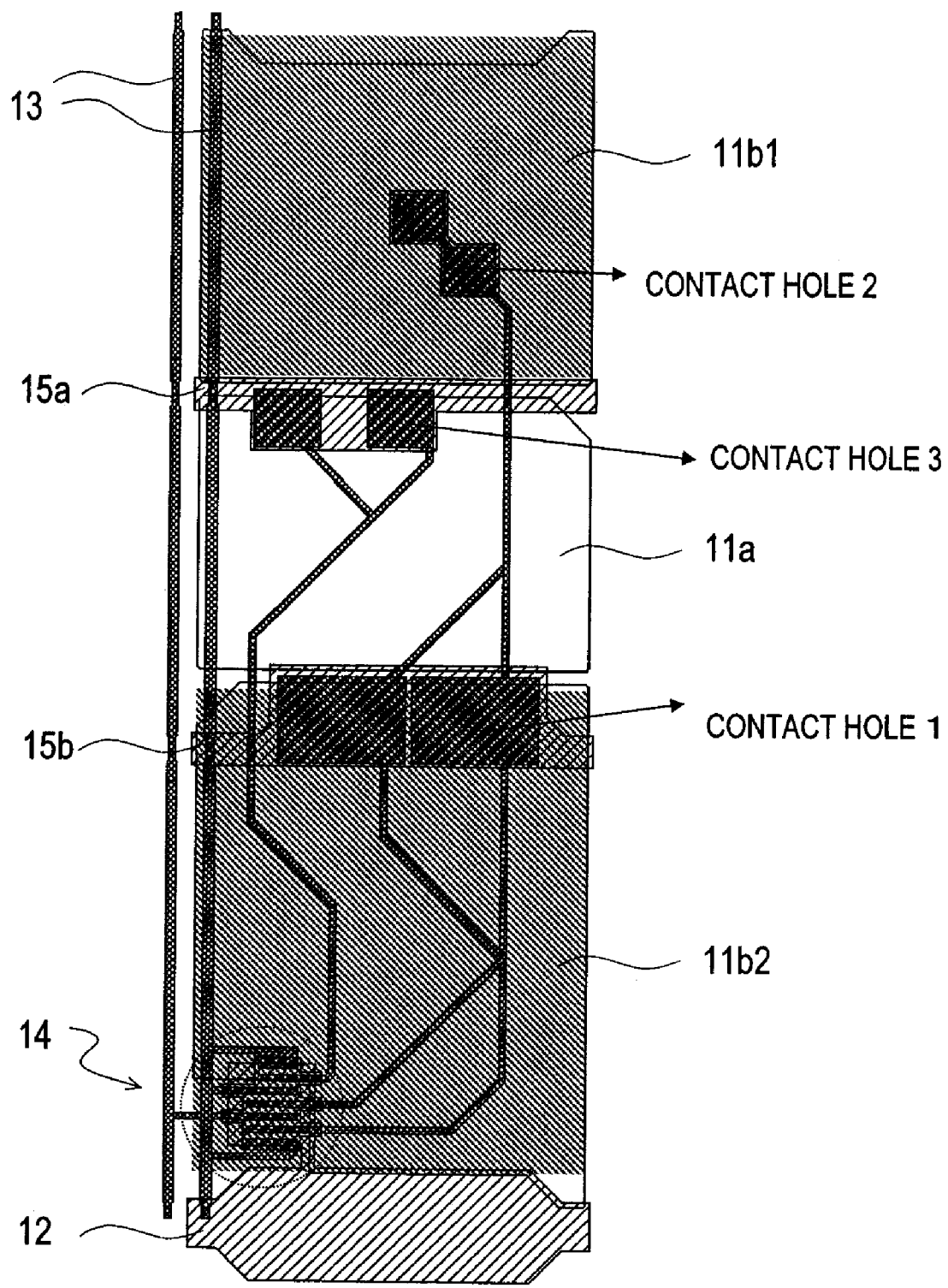
FIG. 21 is a schematic representation illustrating still another specific exemplary pixel structure for a liquid crystal display device according to a preferred embodiment of the present invention.

Also, the pixel division structure shown in FIG. 3(b) may be implemented as the structure shown in FIG. 20 or 21. The pixel division structure shown in FIG. 21 has the same electrical configuration as the counterpart shown in FIG. 17(a) but is different from the counterpart shown in FIG. 17(a) in the area ratio of the bright subpixel and in that the luminance centroid of the bright subpixel agrees with the geometric centroid of the pixel.

Comparing the structures shown in FIGS. 20 and 21 with each other, it can be seen that the area ratio of the bright subpixel to the dark subpixel is almost one to one in FIG. 20 but is approximately one to three in FIG. 21, and therefore, the pixel arrangement shown in FIG. 21 has lighter viewing angle dependence of the γ characteristic than the arrangement shown in FIG. 20.

Figure 22:
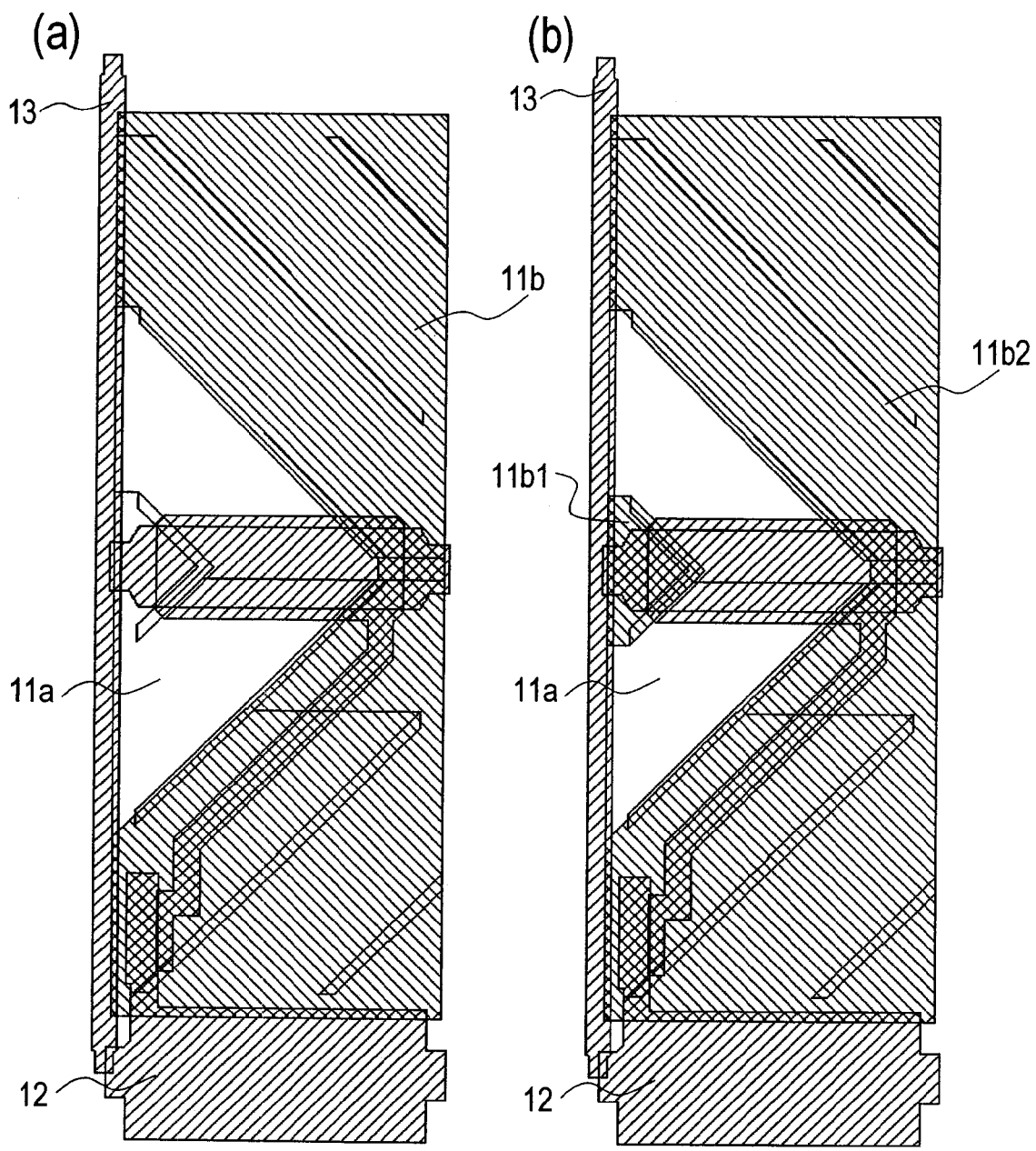
FIGS. 22(a) and 22(b) are schematic representations illustrating yet another specific exemplary pixel structure for a liquid crystal display device according to a preferred embodiment of the present invention.

FIGS. 22(a) and 22(b) show examples in which each pixel is split along a domain boundary that is defined by slits and ribs extending obliquely at an angle of 45 degrees.

In the pixel division structure shown in FIG. 22(a), the luminance centroid of the bright subpixel (subpixel electrode 11a) and the geometric centroid of the pixel have the same Y coordinate but mutually different X coordinates. On the other hand, in the pixel division structure shown in FIG. 22(b), the luminance centroid of the bright subpixel (subpixel electrode 11a) and the geometric centroid of the pixel have not only the same Y coordinate but also almost the same X coordinate as well.

The specific examples of the present invention described above are typical striped arrangements. However, the present invention is also applicable to a delta arrangement or any other pixel arrangement.

According to the present invention, the display quality of a VA mode liquid crystal display device can be improved with the viewing angle dependence of the γ characteristic reduced by adopting the pixel division technique. The liquid crystal display device of the present invention can be used effectively in an LCD TV monitor with a huge screen, among other things.

The invention claimed is:

1. A liquid crystal display device comprising a plurality of pixels that are arranged in matrix so as to form a plurality of rows extending in an X direction and a plurality of columns extending in a Y direction, wherein each said pixel includes a liquid crystal layer and a plurality of electrodes for applying a voltage to the liquid crystal layer, and is split into at least one bright subpixel, which has a luminance higher than a certain luminance produced by a display signal voltage supplied, and at least one dark subpixel that has a lower luminance than the certain luminance, and wherein the area of the at least one bright subpixel is smaller than that of the at least one dark subpixel, and wherein if the at least one bright subpixel and the at least one dark subpixel are arranged in the Y direction in each said pixel, two closest pixels that belong to the same row to display the same color have geometric centroids with the same Y coordinate, the greatest difference between the Y coordinates of luminance centroids being equal to or smaller than a half of the length $R_Y$ of the two pixels as measured in the Y direction, or wherein if the at least one bright subpixel and the at least one dark subpixel are arranged in the X direction in each said pixel, two pixels that are adjacent to each other in the column direction have geometric centroids with the same X coordinate, the greatest difference between the X coordinates of luminance centroids being equal to or smaller than a half of the length $R_X$ of the two pixels as measured in the X direction, and wherein the luminance centroid of the at least one bright subpixel is different from the geometric centroid of the pixel.

2. The liquid crystal display device of claim 1, wherein the at least one bright subpixel that each said pixel has is the only bright subpixel of that pixel.

3. The liquid crystal display device of claim 1, wherein the luminance centroids of the bright subpixels of the two pixels have the same Y coordinate.

4. The liquid crystal display device of claim 1, wherein the Y coordinate of the luminance centroid of the only bright subpixel agrees with that of the geometric centroid of the pixel.

5. The liquid crystal display device of claim 1, wherein the area of the at least one dark subpixel is at least three times as large as that of the at least one bright subpixel.

6. A liquid crystal display device comprising a plurality of pixels that are arranged in matrix so as to form a plurality of rows extending in an X direction and a plurality of columns extending in a Y direction,
wherein each said pixel includes a liquid crystal layer and a plurality of electrodes for applying a voltage to the liquid crystal layer, and is split into at least one bright subpixel, which has a luminance higher than a certain luminance produced by a display signal voltage supplied, and at least one dark subpixel that has a lower luminance than the certain luminance,
wherein the area of the at least one bright subpixel is smaller than that of the at least one dark subpixel, and
wherein if the at least one bright subpixel and the at least one dark subpixel are arranged in the Y direction in each said pixel, two closest pixels that belong to the same row to display the same color have geometric centroids with the same Y coordinate, the greatest difference between the Y coordinates of luminance centroids being equal to or smaller than a half of the length $R_Y$ of the two pixels as measured in the Y direction, or
wherein if the at least one bright subpixel and the at least one dark subpixel are arranged in the X direction in each said pixel, two pixels that are adjacent to each other in the column direction have geometric centroids with the same X coordinate, the greatest difference between the X coordinates of luminance centroids being equal to or smaller than a half of the length $R_X$ of the two pixels as measured in the X direction, and
wherein the luminance centroid of the at least one bright subpixel is different from that of the at least one dark subpixel.

7. The liquid crystal display device of claim 6, wherein the at least one bright subpixel that each said pixel has is the only bright subpixel of that pixel.

8. The liquid crystal display device of claim 6, wherein the luminance centroids of the bright subpixels of the two pixels have the same Y coordinate.

9. The liquid crystal display device of claim 7, wherein the Y coordinate of the luminance centroid of the only bright subpixel agrees with that of the geometric centroid of the pixel.

10. The liquid crystal display device of claim 6, wherein the area of the at least one dark subpixel is at least three times as large as that of the at least one bright subpixel.

11. A liquid crystal display device comprising a plurality of pixels that are arranged in matrix so as to form a plurality of rows extending in an X direction and a plurality of columns extending in a Y direction,
wherein each said pixel includes a liquid crystal layer and a plurality of electrodes for applying a voltage to the liquid crystal layer, and is split into at least one bright subpixel, which has a luminance higher than a certain luminance produced by a display signal voltage supplied, and at least one dark subpixel that has a lower luminance than the certain luminance, and
wherein the area of the at least one bright subpixel is smaller than that of the at least one dark subpixel, and
wherein if the at least one bright subpixel and the at least one dark subpixel are arranged in the Y direction in each said pixel, two closest pixels that belong to the same row to display the same color have geometric centroids with mutually different Y coordinates, the greatest difference between the Y coordinates of luminance centroids being equal to or smaller than a half of the length $R_Y$ of the two pixels as measured in the Y direction, or
wherein if the at least one bright subpixel and the at least one dark subpixel are arranged in the X direction in each said pixel, two pixels that are adjacent to each other in the column direction have geometric centroids with mutually different X coordinates, the greatest difference between the X coordinates of luminance centroids being equal to or smaller than a half of the length $R_X$ of the two pixels as measured in the X direction.

12. The liquid crystal display device of claim 11, wherein supposing the geometric centroid of one of the two closest pixels that belong to the same row to display the same color is defined as an origin, the Y coordinate of the luminance centroid of the bright subpixel of that pixel is positive, and
wherein supposing the geometric centroid of the other pixel is defined as an origin, the Y coordinate of the luminance centroid of the bright subpixel of that pixel is negative.

13. The liquid crystal display device of claim 11, wherein in every pixel belonging to the same column, the at least one bright subpixel and the at least one dark subpixel are arranged at the same locations of theirs.

14. The liquid crystal display device of claim 11, wherein the at least one bright subpixel that each said pixel has is the only bright subpixel of that pixel.

15. The liquid crystal display device of claim 14, wherein the at least one dark subpixel that each said pixel has is the only dark subpixel of that pixel.

16. The liquid crystal display device of claim 11, wherein the area of the at least one dark subpixel is at least three times as large as that of the at least one bright subpixel.

17. A liquid crystal display device comprising a plurality of pixels that are arranged in matrix so as to form a plurality of rows extending in an X direction and a plurality of columns extending in a Y direction,
wherein each said pixel includes a liquid crystal layer and a plurality of electrodes for applying a voltage to the liquid crystal layer, and is split into at least one bright subpixel, which has a luminance higher than a certain luminance produced by a display signal voltage supplied, and at least one dark subpixel that has a lower luminance than the certain luminance, and
wherein the area of the at least one bright subpixel is smaller than that of the at least one dark subpixel, and
wherein if the at least one bright subpixel and the at least one dark subpixel are arranged in the Y direction in each said pixel, two closest pixels that belong to the same row to display the same color have geometric centroids with mutually different Y coordinates, a difference between the Y coordinates of the luminance centroids of their respective bright subpixels being equal to or smaller than a half of the length $R_Y$ of the two pixels as measured in the Y direction, or
wherein if the at least one bright subpixel and the at least one dark subpixel are arranged in the X direction in each said pixel, two pixels that are adjacent to each other in the column direction have geometric centroids with mutually different X coordinates, a difference between the X coordinates of the luminance centroids of their respective bright subpixels being equal to or smaller than a half of the length $R_X$ of the two pixels as measured in the X direction.

* * * * *